US012197147B2

(12) United States Patent
Tanaka

(10) Patent No.: US 12,197,147 B2
(45) **Date of Patent: *Jan. 14, 2025**

(54) DEVELOPING DEVICE HAVING ENHANCED CARRIER CONTROL

(71) Applicant: CANON KABUSHIKI KAISHA, Tokyo (JP)

(72) Inventor: Chihiro Tanaka, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/388,309

(22) Filed: Nov. 9, 2023

(65) Prior Publication Data

US 2024/0069470 A1 Feb. 29, 2024

Related U.S. Application Data

(62) Division of application No. 18/093,888, filed on Jan. 6, 2023, now Pat. No. 11,846,898.

(30) Foreign Application Priority Data

Jan. 27, 2022 (JP) ................................ 2022-011050

(51) Int. Cl.
*G03G 15/09* (2006.01)
*G03G 15/01* (2006.01)
(Continued)

(52) U.S. Cl.
CPC ..... *G03G 15/0921* (2013.01); *G03G 15/0121* (2013.01); *G03G 15/0808* (2013.01);
(Continued)

(58) Field of Classification Search
CPC .......... G03G 15/0121; G03G 15/0808; G03G 15/0812; G03G 15/0818; G03G 15/0921;
(Continued)

(56) References Cited

U.S. PATENT DOCUMENTS 7,787,807 B2 8/2010 Nakaue et al.
9,599,926 B2 3/2017 Ishida et al.
(Continued)

FOREIGN PATENT DOCUMENTS

JP 2008-003256 A 1/2008
JP 2008-233223 A 10/2008
(Continued)

*Primary Examiner* — Joseph S Wong
(74) *Attorney, Agent, or Firm* — VENABLE LLP

(57) ABSTRACT

A developing device includes a developing container, a developing roller, a supplying roller, a first magnet including a first magnetic pole, a second magnet including second to fifth magnetic poles, and a regulating member. A maximum magnetic flux density of the second magnetic pole is larger in absolute value than a maximum magnetic flux density of the third magnetic pole in a normal direction to the supplying roller, and a maximum magnetic flux density of the third magnetic pole is larger in absolute value than a maximum magnetic flux density of the fourth magnetic pole in the normal direction. With respect to a rotational direction of the supplying roller, an angle between maximum magnetic flux density positions of the second and third magnetic poles is smaller than an angle between maximum magnetic flux density positions of the third and fourth magnetic poles.

20 Claims, 10 Drawing Sheets

(51) Int. Cl.
*G03G 15/08* (2006.01)
*G03G 15/095* (2006.01)

(52) U.S. Cl.
CPC ..... *G03G 15/0812* (2013.01); *G03G 15/0818* (2013.01); *G03G 15/09* (2013.01); *G03G 15/0928* (2013.01); *G03G 15/095* (2013.01)

(58) Field of Classification Search
CPC ... G03G 15/09; G03G 15/0928; G03G 15/095
See application file for complete search history.

(56) References Cited

U.S. PATENT DOCUMENTS

| | | | | |
|---|---|---|---|---|
| 10,739,703 | B2 | 8/2020 | Tanaka | |
| 11,846,898 | B2 * | 12/2023 | Tanaka .................. | G03G 15/09 |
| 2017/0269508 | A1 | 9/2017 | Shimizu et al. | |
| 2017/0269510 | A1 | 9/2017 | Tamaki et al. | |
| 2018/0181052 | A1 | 6/2018 | Hamakawa | |
| 2023/0259052 | A1 | 8/2023 | Mugita | |

FOREIGN PATENT DOCUMENTS

| | | | |
|---|---|---|---|
| JP | 2008-262025 | A | 10/2008 |
| JP | 2014-153608 | A | 8/2014 |

* cited by examiner

| | MAGNETIC FLUX DENSITY | | | | TEST RESULT | | | | |
|---|---|---|---|---|---|---|---|---|---|
| | MAIN N1 | HOLD S1 | RGLT N2 | SCOOP N2 | GHOST IMAGE | C. D. I. | T. A. (DD) | FOG (DD) | SCCP PRFM |
| EMB. 3 | 90mT | 55mT | 50mT | 45mT | ○ | ○ | 48% | ○ | 250g |
| EMB. 4 | 90mT | 55mT | 50mT (ASYM) | 45mT | ○ | ○ | 44% | ○ | 260g |
| COMP. EX. 2 | 90mT | 55mT | 60mT | 45mT | ○ | ○ | 55% | × | 250g |
| COMP. EX. 3 | 90mT | 55mT | 50mT | 55mT | ○ | ○ | 53% | × | 250g |
| EMB. 5 | 80mT | 90mT | 50mT | 45mT | × | ○ | 47% | ○ | 250g |

Fig. 10

DEVELOPING DEVICE HAVING ENHANCED CARRIER CONTROL

FIELD OF THE INVENTION AND RELATED ART

The present invention relates to a developing device including a supplying roller and a developing roller.

In the developing device, conventionally, one using a two-component developer containing toner comprising non-magnetic particles and a carrier comprising magnetic particles (hereinafter, the two-component developer is simply referred to as the developer) has been known. As such a developing device, a constitution using a so-called hybrid developing type including a developing roller as a rotatable developing member provided opposed to a photosensitive drum as an image bearing member and a supplying roller as a rotatable supplying member provided opposed to the developing roller has been proposed (Japanese Laid-Open Patent Application (JP-A) 2008-3256).

In the developing device using such a hybrid type, the developer is carried on the supplying roller in which a magnet is provided and a toner layer is formed on the developing roller from the developer conveyed by rotation of the supplying roller, and then an electrostatic latent image on the photosensitive drum is developed with toner supplied from the developing roller.

In the developing device disclosed in JP-A 2008-3256, the magnet disposed inside the supplying roller includes a main pole in a position opposing the developing roller, and a magnet provided inside the developing roller includes a receiving pole different in polarity from the main pole in a position opposing the supplying roller. Further, on a side upstream of the main pole with respect to a rotational direction of the supplying roller, a regulating member for regulating an amount of the developer carried on the supplying roller is provided. The magnet disposed inside the supplying roller includes, with respect to the rotational direction of the supplying roller, a regulating pole which is of the same polarity as the main pole and which is disposed is a position opposing the regulating member on a side upstream of the main pole, and includes a holding pole which is different in polarity from the main pole and which is disposed between the regulating pole and the main pole. In JP-A 2008-3256, by providing the holding pole on a side upstream of the main pole, a carrier holding force is enhanced between the main pole and the holding pole, so that carrier deposition on the developing roller is suppressed.

In recent years, speed-up of the image forming apparatus advances, so that rotational speeds of the supplying roller and the developing roller become high. For this reason, the carrier in the developer is liable to fly from the supplying roller. As a result, the carrier is liable to be deposited on the developing roller.

SUMMARY OF THE INVENTION

A principal object of the present invention is to provide a developing device including a supplying roller and a developing roller and capable of reducing a degree of carrier deposition onto the developing roller.

According to an aspect of the present invention, there is provided a developing device comprising: a developing container configured to accommodate a developer containing toner and a carrier; a developing roller configured to carry and convey the toner to a developing position where an electrostatic latent image formed on an image bearing member is developed with the toner; a supplying roller provided opposed to the developing roller and configured to supply only the toner to the developing roller while carrying and conveying the developer supplied from the developing container, said supplying roller being rotated in a rotational direction opposite to a rotational direction of the developing roller in a position where the supplying roller and the developing roller oppose each other; a first magnet provided non-rotationally and fixedly inside the developing roller and including a first magnetic pole; a second magnet provided non-rotationally and fixedly inside the supplying roller and including: a second magnetic pole which is provided opposed to the first magnetic pole in a position where the supplying roller opposes the developing roller and which is different in polarity from the first magnetic pole, a third magnetic pole which is provided upstream of and adjacent to the second magnetic pole with respect to the rotational direction of the supplying roller and which is different in polarity from the second magnetic pole, and a fourth magnetic pole which is provided upstream of and adjacent to the third magnetic pole with respect to the rotational direction of the supplying roller and which is different in polarity from the third magnetic pole; and a regulating member provided opposed to the fourth magnetic pole and configured to regulate an amount of the developer carried on the supplying roller, wherein with respect to a normal direction to an outer peripheral surface of the supplying roller, an absolute value of a maximum magnetic flux density of the second magnetic pole is larger than an absolute value of a maximum magnetic flux density of the third magnetic pole, and an absolute value of a maximum magnetic flux density of the third magnetic pole is larger than an absolute value of a maximum magnetic flux density of the fourth magnetic pole, and wherein with respect to the rotational direction of the supplying roller, an angle between a position where the magnetic flux density of the second magnetic pole becomes maximum with respect to the normal direction and a position where the magnetic flux density of the third magnetic pole becomes maximum with respect to the normal direction is smaller than an angle between a position where the magnetic flux density of the third magnetic pole becomes maximum with respect to the normal direction and a position where the magnetic flux density of the fourth magnetic pole becomes maximum with respect to the normal direction by 10 degrees or more.

Further features of the present invention will become apparent from the following description of exemplary embodiments with reference to the attached drawings.

BRIEF DESCRIPTION OF THE DRAWINGS

FIG. 10 is a table showing a result of an experiment conducted for checking an effect of the embodiment 2, the embodiment 4, the comparison example 2, the comparison example 3, and an embodiment 5.

DESCRIPTION OF THE EMBODIMENTS

First Embodiment

A first embodiment will be described using FIGS. 1 to 4. Incidentally, in this embodiment, the case where a developing device is applied to a full-color printer of a tandem type as an example of an image forming apparatus is described.

[Image Forming Apparatus]

First, a schematic structure of an image forming apparatus 100 will be described using FIG. 1.

Figure 1:
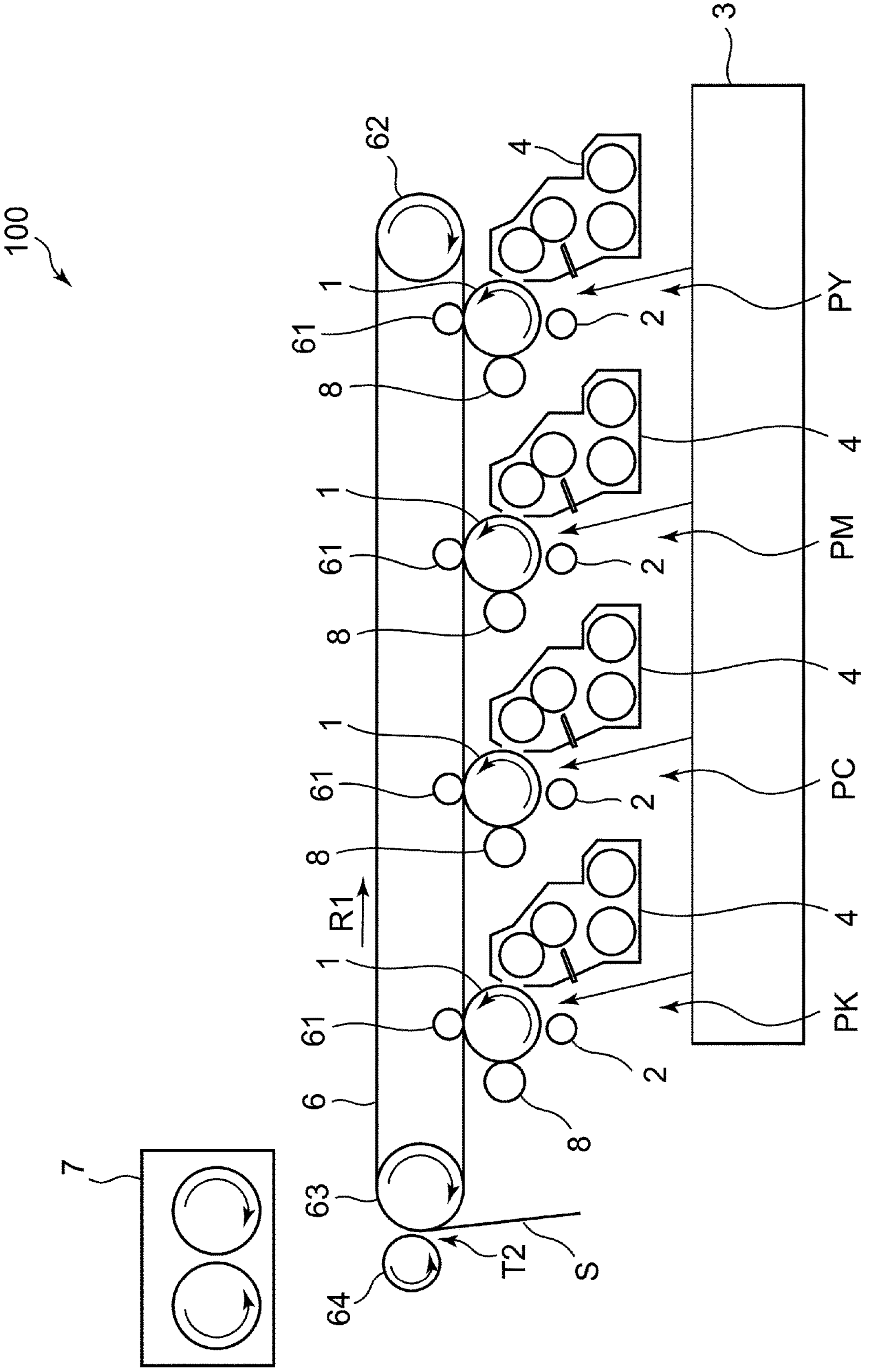
FIG. 1 is a schematic structural sectional view of an image forming apparatus in a first embodiment.

The image forming apparatus 100 shown in FIG. 1 is a full-color printer of an electrophotographic type including image forming portions PY, PM, PC and PK for four colors (yellow, magenta, cyan and black, respectively) in an apparatus main assembly. In this embodiment, an intermediary transfer tandem type in which the image forming portions PY, PM, PC, and PK are disposed along a rotational direction of an intermediary transfer belt 6 described later is employed. The image forming apparatus 100 forms a toner image (image) on a recording material S depending on an image signal from a host device such as a personal computer connected communicatably to the apparatus main assembly or to an unshown original reading device connected to the apparatus main assembly. As the recording material S, it is possible to cite a sheet material such as a sheet, a plastic film, or a cloth.

A toner image forming process will be described. First, the image forming portions PY, PM, PC and PK, will be described. The image forming portions PY, PM, PC and PK are constituted substantially the same except that colors of toners are different from each other so as to be yellow, magenta, cyan and black, respectively. Therefore, in the following, the image forming portion PY for yellow will be described as an example, and other image forming portions PM, PC and PK will be omitted from description.

The image forming portion PY is constituted principally by the photosensitive drum 1, a charging device 2, a developing device 4, a cleaning device 8, and the like. In this embodiment, the intermediary transfer belt 6 is provided above the image forming portions PY, PM, PC and PK, and an exposure device 3 is provided below the image forming portions PY, PM, PC and PK. The photosensitive drum 1 as an image bearing member and a photosensitive member includes a photosensitive layer formed on an outer peripheral surface of an aluminum cylinder so as to have a negative charge polarity or a positive charge polarity, and is rotated at a predetermined process speed (peripheral speed).

The charging device 2 electrically charges the surface of the photosensitive drum 1 to, e.g., a uniform negative or positive dark-portion potential depending on a charging characteristic of the photosensitive drum 1. In this embodiment, the charging device 2 is a charging roller rotatable in contact with the surface of the photosensitive drum 1. After the charging, at the surface of the photosensitive drum 1, an electrostatic latent image is formed on the basis of image information by the exposure device (laser scanner) 3. The photosensitive drum 1 carries the formed electrostatic image and is circulated and moved, and the electrostatic latent image is developed with the toner by the developing device 4. Details of a structure of the developing device 4 will be described later. The toner in the developer consumed by image formation is supplied together with a carrier from an unshown toner cartridge.

The toner image developed from the electrostatic latent image is supplied with a predetermined pressing force and a primary transfer bias by a primary transfer roller 61 provided opposed to the photosensitive drum 1 through the intermediary transfer belt 6, and is primary-transferred onto the intermediary transfer belt 6. The surface of the photosensitive drum 1 after the primary transfer is discharged by an unshown pre-exposure portion. The cleaning device 8 removes a residual matter such as transfer residual toner remaining on the surface of the photosensitive drum 1 after the primary transfer.

The intermediary transfer belt 6 is stretched by a stretching roller 62 and an inner secondary transfer roller 63. The intermediary transfer belt 6 is driven so as to be moved in an angle R1 direction in FIG. 1 by the inner secondary transfer roller 63 which is also a driving roller. The image forming processes for the respective colors performed by the above-described image forming portions PY, PM, PC and PK are carried out at timings each when an associated color toner image is superposed on the upstream color toner image primary-transferred on the intermediary transfer belt 6 with respect to a movement direction of the intermediary transfer belt 6. As a result, finally, a full-color toner image is formed on the intermediary transfer belt 6 and is conveyed toward a secondary transfer portion T2. The secondary transfer portion T2 is a transfer nip formed by an outer secondary transfer roller 64 and a portion of the intermediary transfer belt 6 stretched by the inner secondary transfer roller 63. Incidentally, the transfer residual toner after passing through the secondary transfer portion T2 is removed from the surface of the intermediary transfer belt 6 in an unshown belt cleaning device.

Relative to the toner image forming process of the toner image sent to the secondary transfer portion T2, at a similar timing, a conveying (feeding) process of the recording material S to the secondary transfer portion T2 is executed. In this conveying process, the recording material S is fed from an unshown sheet cassette or the like and is sent to the secondary transfer portion T2 in synchronism with the image formation timing. In the secondary transfer portion T2, a secondary transfer voltage is applied to the inner secondary transfer roller 63.

By the image forming process and the conveying process which are described above, in the secondary transfer portion T2, the toner image is secondary-transferred from the intermediary transfer belt 6 onto the recording material S. Thereafter, the recording material S is conveyed to a fixing device 7, and is heated and pressed by the fixing device 7, so that the toner image is melted and fixed on the recording material S. Thus, the recording material S on which the toner image is fixed is discharged on a discharge tray by a discharging roller.

[Controller]

The image forming apparatus 100 includes a controller 20 for carrying out various pieces of control such as the above-described image forming operation and the like. Operations of respective portions of the image forming apparatus 100 are controlled by the controller 20 provided in the image forming apparatus 100. A series of the image forming operations is controlled by an operating portion at an upper portion of the apparatus main assembly or by the controller 20 in accordance with respective image forming signals via a network.

Figure 2:
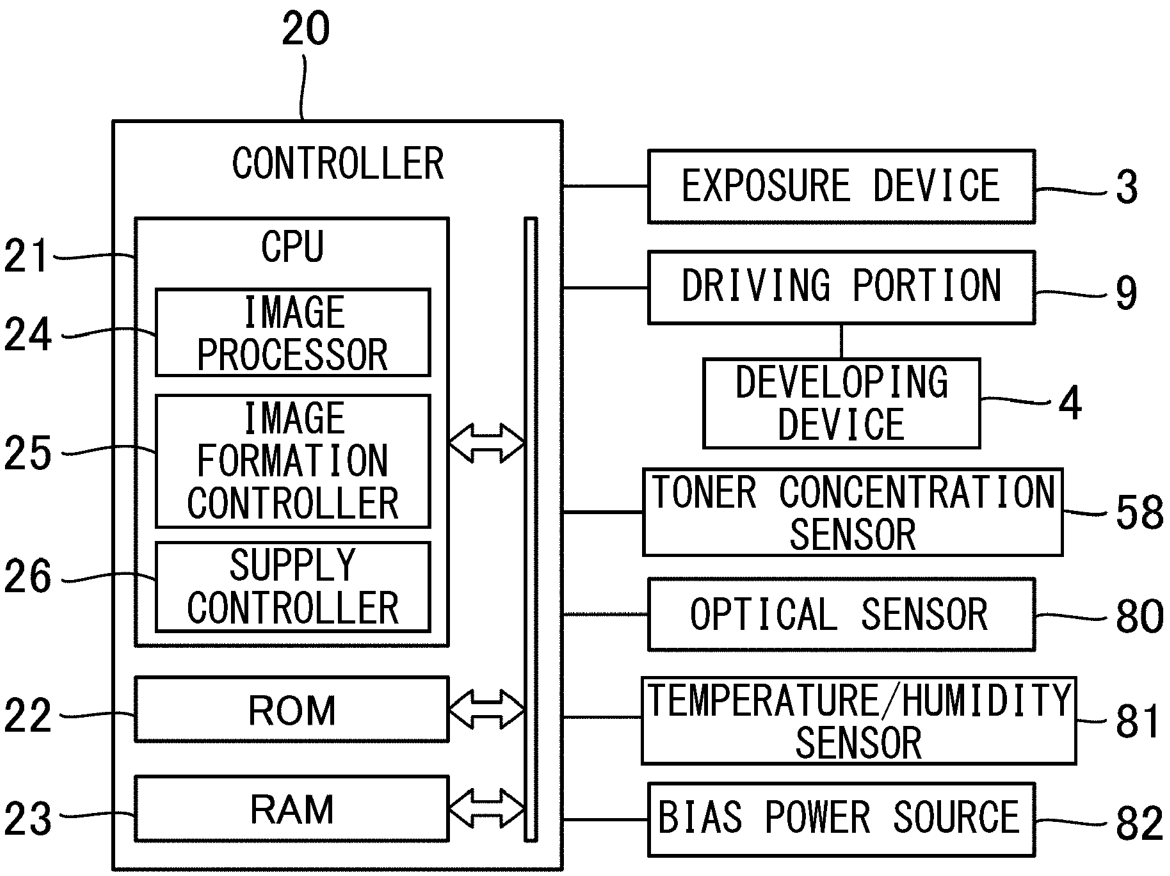
FIG. 2 is a control black diagram of the image forming apparatus in the first embodiment.

As shown in FIG. 2, the controller 20 includes a CPU (Central Processing Unit) 21 as a calculation control means, ROM (Read Only Memory) 22, a RAM (Random Access Memory) 23, and the like. The CPU 21 controls the respective portions of the image forming apparatus 100 while reading a program corresponding to a control procedure stored in the ROM 22. In the RAM 23, operation data and input data are stored, and the CPU 21 carries out control on the basis of the above-described program or the like by making reference to the data stored in the RAM 23.

The controller 20 generates driving signals of the respective portions by processing image information by an image processing portion 24 and controls the operations of the respective portions such as a driving portion 9 for driving the exposure device 3 and the developing device 4 by an image formation controller 25, and thus carries out toner supply control to the developing device 4 by the supply controller 26. The driving portion 9 includes a driving motor for driving a developing roller 50, a supplying roller 51, a first feeding screw 44, and a second feeding screw 45 which are described later.

To the controller, a toner concentration sensor 58, an optical sensor 80, a temperature and humidity sensor 81, a bias power source 82, and the like are connected. The toner concentration sensor 58 will be described later. The optical sensor 80 is disposed so as to oppose the surface of the intermediary transfer belt 6 and detects a density of a patch image which is a control toner image formed on the intermediary transfer belt 6. Depending on the density of the patch image detected by the optical sensor 80, the supply control of the toner to the developing device 4 and the like are carried out. The bias power source 82 is a power source for applying voltages to the developing roller 50 and the supplying roller 51 as described later.

The temperature and humidity sensor 81 is provided as an example of a detecting means, for example, at a part of a wall portion of a stirring chamber 43 on a downstream side of a toner conveying (feeding) direction in order to detect information on a temperature and a humidity in the developing device 4. A controller 20 calculates an absolute water content in the developing device 4 on the basis of the information, on the temperature and the humidity in the developing device 4, which is a detection result of the temperature and humidity sensor 81. That is, the temperature and humidity sensor 81 detects information on the absolute water content inside a developing container 40. Incidentally, in this embodiment, the controller 20 calculates information on a volume absolute humidity as the information on the absolute water content. Further, in this embodiment, the case where the controller 20 calculates the information on the volume absolute humidity as the information on the absolute water content was described, but the present invention is not limited to this, but the controller 20 may calculate information on a weight absolute humidity as the information on the absolute water content.

[Two-Component Developer]

Next, the developer used in this embodiment will be described. In this embodiment, as the developer, a two-component developer which contains non-magnetic toner particles (toner) and magnetic carrier particles (carrier) and which has a mixing coating ratio, of the toner on the carrier, of 8.0 weight % is used. The toner is colored resin particles containing a binder resin, a colorant, and other additives as desired, and onto a surface thereof, an external additive such as colloidal silica fine powder is externally added. The toner used in this embodiment is a negatively chargeable or positively chargeable polyester resin material depending on a charging characteristic of the photosensitive drum 1 and is about 7.0 μm in volume-average particle size. The carrier used in this embodiment comprises magnetic metal particles of, for example, iron, nickel, cobalt or the like, of which surface is oxidized, and is about 40 μm or more and about 50 μm or less in volume average particle size.

[Developing Device]

Figure 3:
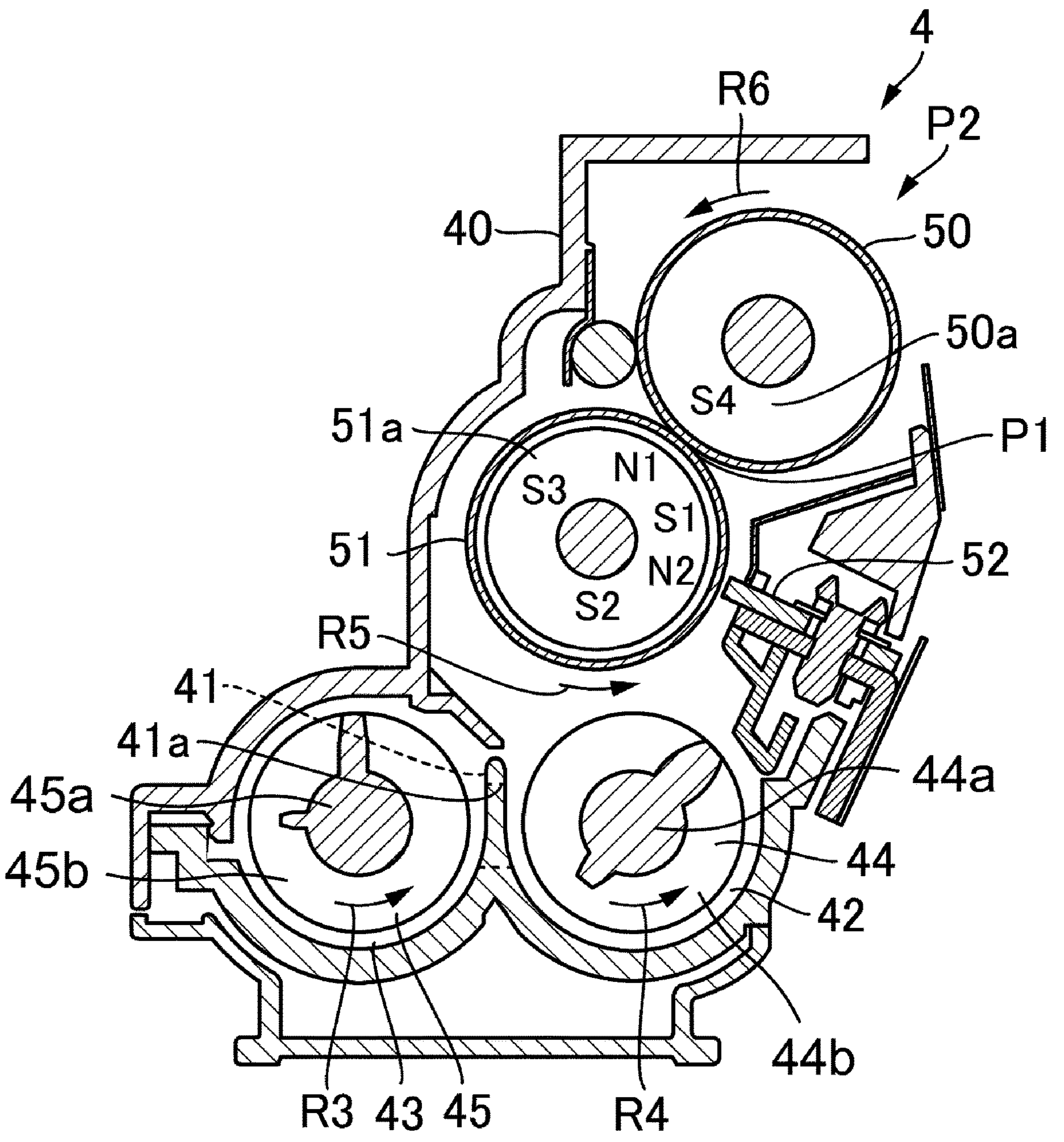
FIG. 3 is a sectional view of a developing device according to the first embodiment.

Next, the developing device 4 will be specifically described using FIG. 3. The developing device 4 of this embodiment is a developing device of a so-called touch-down developing type in which a thin layer of only the toner is formed on the developing roller 50 with a magnetic brush by the two-component developer formed on the supplying roller 51 and then development is carried out by causing the toner onto the electrostatic latent image formed on the photosensitive drum 1 by a developing bias, obtained by superimposing a DC and an AC, which is applied to the developing roller 50.

As shown in FIG. 3, the developing device 4 includes the developing container 40, the developing roller 50 as the rotatable developing member, and the supplying roller 51 as the rotatably supplying member. In the developing container 40, the developer containing the non-magnetic toner and the magnetic carrier is accommodated. The developing container 40 includes a developing chamber 42 as a first chamber, a stirring chamber 43 as a second chamber, and a partition wall 41 as a partitioning wall. The stirring chamber 43 is disposed adjacent to the developing chamber 42 so as to overlap at least partially with the developing chamber 42 as viewed in a horizontal direction. The partition wall 41 partitions between the developing chamber 42 and the stirring chamber 43. The partition wall 41 is provided with an opening **41*a* as a communicating portion for establishing communication between the developing chamber 42 and the stirring chamber 43 on each of opposite end sides with respect to a longitudinal direction (rotational axis direction of the developing roller 50 and the supplying roller 51). The developing device 40 forms a circulation passage along which the developer is circulated between the developing chamber 42 and the stirring chamber 43 via the opening 41*a* provided in the partition wall 41**.

In this embodiment, the partition wall 41 is provided at a substantially central portion in the developing container 40. By this, the developing device 40 is partitioned by the partition wall 41 so that the developing chamber 42 and the stirring chamber 43 are adjacent to each other in the horizontal direction. In the developing chamber 42 and the stirring chamber 43, a first feeding screw 44 and a second feeding screw 45 which are rotatable are provided for stirring and circulating the developer.

The first feeding screw 44 as a first feeding member is disposed opposed substantially parallel to the supplying roller 51 along the rotational axis direction (longitudinal direction) of the supplying roller 51 at a bottom in the developing chamber 42 (in the first chamber). The first feeding screw 44 includes a rotation shaft 44*a* and a blade 44*b* provided helically at a periphery of the rotation shaft 44*a*. The second feeding screw 45 as a second feeding member is disposed opposed substantially parallel to the first feeding screw 44 at a bottom in the stirring chamber 43 (in the second chamber). The second feeding screw 45 includes a rotation shaft 45*a* and a blade 45*b* provided helically at a periphery of the rotation shaft 45*a*.

The first feeding screw 44 and the second feeding screw 45 are rotated in an arrow R4 direction and an arrow R3 direction, respectively, so that the developer is fed in the developing chamber 42 and the stirring chamber 43, respectively. The developer fed by rotation of the first feeding screw 44 and the second feeding screw 45 is circulated between the developing chamber 42 and the stirring chamber 43 through the opening 41*a* at each of opposite end portions of the partition wall 41. The toner is stirred by the first feeding screw 44 and the second feeding screw 45, whereby the toner is triboelectrically charged to a negative polarity or a positive polarity by friction with the carrier.

In the stirring humidity 43, a toner concentration sensor 58 (FIG. 2) is provided facing the second feeding screw 45. As the toner concentration sensor 58, for example, a permeability sensor for detecting permeability of the developer in the developing container 40 is used. On the basis of the detection result of the toner concentration sensor 58, the controller 20 causes the toner cartridge to supply the toner to the stirring chamber 43 through a toner supply opening (not shown).

As shown in FIG. 3, the developing roller 50 and the supplying roller 51 are disposed above the developing chamber 42 and the stirring chamber 43 with respect to a vertical direction. The developing roller 50 is provided obliquely on the supplying roller 51 between the supplying roller 51 and the photosensitive drum 1 as viewed in the rotational axis direction of the supplying roller 51. The supplying roller 51 and the developing roller 50 are disposed is opposed to each other in an opposing portion P1 with rotational axes thereof substantially parallel to each other. The developing position 50 opposes the photosensitive drum 1 on an opening side of the developing container 40. Each of the developing roller 50 and the supplying roller 51 is provided rotatably about the rotational axis thereof. Each of the developing roller 50 and the supplying roller 51 is rotationally driven in a counterclockwise direction (arrow B6 direction or arrow R5 direction) by a driving portion 9 (FIG. 2). That is, the developing roller 50 and the supplying roller 51 are rotated in the directions opposite to each other in the opposing portion P1, and rotational speeds thereof are made variable by the driving portion 9.

The supplying roller 51 is a non-magnetic cylindrical roller rotatable in the counterclockwise direction in FIG. 3, and is provided rotatably at a periphery of a non-rotational cylindrical magnet roller 51*a* which is provided on an inner peripheral side and which is a magnetic field generating means and a second magnet. That is, the magnet roller 51*a* is non-rotationally fixed and disposed inside the supplying roller 51. The magnet roller 51*a* includes 5 pieces including, on a surface thereof opposing the supplying roller 51, a scooping pole S2, a regulating pole N2, a holding pole S1, a main pole N1, and a peeling pole S3 in a named order with respect to the rotational direction of the supplying roller 51. Incidentally, in this embodiment, the magnet roller having the 5 poles is used, but a magnet roller having poles other than the 5 poles, and for example, a magnet roller having 7 poles may also be used. However, as an angle between the regulating pole and the main pole becomes wider, a magnetic force acting between the main pole and the holding pole is liable to become smaller, so that carrier deposition is liable to occur. For that reason, a constitution in which the magnet roller 51*a* has the 5 magnetic poles as in this embodiment may preferably be employed for suppressing the carrier deposition.

The main pole N1 is disposed in a position where the supplying roller 51 opposes the developing roller 50 and is different in polarity from a receiving pole S4, described later, of the magnet roller 51*a* in the developing roller 50. The holding pole S1 is disposed upstream of and adjacent to the main pole N1 with respect to the rotational direction of the supplying roller 51 and is different in polarity from the main pole N1. The regulating pole N2 is disposed in a position which is upstream of and adjacent to the holding pole S1 and where the regulating blade 52 described later opposes the supplying roller 51, and is the same in polarity as the main pole N1. The scooping pole S2 is disposed upstream and adjacent to the regulating pole N2 and is different in polarity from the regulating pole N2, and is a magnetic pole for scooping the developer from the developing container 40 to the supplying roller 51. Specifically, the scooping pole S2 is disposed opposed to the first feeding screw 44 at an upper portion of the developing chamber 42. The peeling pole S3 is disposed upstream of and adjacent to the scooping pole S2 with respect to the rotational direction of the supplying roller 51 and is the same in polarity as the scooping pole S2. Further, the peeling pole S3 is disposed downstream of and adjacent to the main pole N1 with respect to the rotational direction of the supplying roller 51 and corresponds to a downstream pole different in polarity from the main pole N1. The scooping pole S2, the regulating pole N2, the holding pole S1, the main pole N1, and the peeling pole S3 are disposed adjacent to each other in a named order with respect to the rotational direction of the supplying roller 51.

The supplying roller 51 carries the developer containing the non-magnetic toner and the magnetic carrier and rotationally conveys the developer to the opposing portion P1 to the developing roller 50. That is, the supplying roller 51 is disposed opposed to the developing roller 50 and supplies the developer inside the developing container 40 to the developing roller 50. The supplying roller 51 has a cylindrical shape of, for example, 20 mm or more and 25 mm or less in diameter (20 mm in this embodiment), and is constituted by a non-magnetic material such as aluminum or non-magnetic stainless steel, and is formed in this embodiment by aluminum. Further, the supplying roller 51 is subjected to blasting so that an outer peripheral surface thereof has surface roughness of, for example, Rz=30 μm.

The regulating blade 52 as a regulating member is disposed upstream, with respect to the rotational direction of the supplying roller 51, of a position where the supplying roller 51 opposes the developing roller 50, and regulates an amount of the developer carried on the supplying roller 51. That is, the regulating blade 52 is a plate-like member and is provided in the developing container 40 so that a free end thereof opposes the outer peripheral surface of the supplying roller 51 in which the regulating pole N2 of the magnetic roller 51*a* is disposed. A predetermined gap is provided between the free end of the regulating blade 52 and the supplying roller 51. Further, a magnetic chain of the developer carried on the surface of the supplying roller 51 is cut by the regulating blade 52, so that a layer thickness of the developer is regulated. Specifically, the regulating blade 52 comprises a metal plate (for example, stainless steel plate) disposed along the longitudinal direction of the supplying roller 51, and the developer passes through between a free end portion of the regulating blade 52 and the supplying roller 51, so that the developer is conveyed in a state in which the amount of the developer is regulated at a certain amount. The regulating blade 52 is formed in an L-shape with a magnetic member such as SUS430 with a thickness of, for example, about 1.5 mm, and is fixed in the developing container 40 so as to extend in the rotational axis direction of the supplying roller 51.

Incidentally, the regulating blade 52 may be either of a magnetic (material) member or a non-magnetic member (material). In the case of the magnetic material, a magnetic field is formed between the free end portion of the regulating blade 52 and the supplying roller 51, and the magnetic attraction force acts on the surface of the regulating blade 52. As a result, the developer is easily cut. Further, there is an advantage such that an interval between the free end of the regulating blade 52 and the supplying roller 51 can be made large, and thus a foreign matter is not readily clogged. On the other hand, in the case of the magnetic material, there is a liability that the developer is constrained by the magnetic field between the free end potion of the regulating blade 52 and the supplying roller 51 and thus a developer deterioration due to friction is liable to occur. Incidentally, a constitution in which the regulating blade 52 is a magnetic member which is applied to a part of the non-magnetic member may be employed. By doing so, the advantage of the magnetic member is somewhat lost, but it is possible to suppress the developer deterioration.

The developer accommodated in the developing chamber 42 is attracted to the surface of the supplying roller 51 by the scooping magnetic pole S2 opposing the supplying roller 51 and is conveyed toward the regulating blade 52. The developer is erected by the regulating magnetic pole N2 opposing the regulating blade 52, and a layer thickness thereof is regulated by the regulating blade 52. The developer layer passes through the holding pole S1, and is carried and conveyed to the opposing the photosensitive drum 1 and then supplies the toner to the surface of the developing roller 50 in a state in which the magnetic chains are formed by the main pole N1 opposing the developing region. To the supplying roller 51, a supplying bias in the form of superimposition of a DC voltage and an AC voltage is applied.

The developing roller 50 is disposed opposed to the photosensitive drum 1 and conveys the developer to a developing position where the electrostatic latent image formed on the photosensitive drum 1 is developed by rotation of the developing roller 50. That is, the developing roller 50 is a non-magnetic roller rotatable in the counterclockwise direction in FIG. 3 and is provided rotatably around the magnet roller 50*a* as a first magnet which includes a single receiving pole S4 provided on an inner peripheral surface side and which does not rotate. The developing roller 50 is capable of developing the electrostatic latent image on the photosensitive drum 1 in the developing region which is an opposing region to the photosensitive drum 1 by being rotated while carrying the toner. The supplying roller 51 and the developing roller 50 oppose each other in the opposing portion P1 with a predetermined gap. The receiving pole S4 of the magnet roller 50*a* of the developing roller 50 is different in polarity from the main pole N1 opposing the receiving pole S4.

To the developing roller 50, a developing bias in the form of superimposition of a DV voltage and an AC voltage is applied. The developing bias and the supplying bias are applied from a bias power source 82 (FIG. 2) as an example of a voltage applying portion to the developing roller 50 and the supplying roller 51, respectively through a bias control circuit.

That is, the bias power source 82 applies a voltage including a DC component and an AC component to between the developing roller 50 and the supplying roller 51.

Toner remaining on the developing roller 50 without being used for the development is conveyed again to the opposing portion P1 between the developing roller 50 and the supplying roller 51 and is rubbed with the magnetic chains on the supplying roller 51, thus being collected by the supplying roller 51. The magnetic chains are peeled off from the supplying roller 51 in a peeling region formed by repulsion of the peeling pole S3 and the scooping pole S3 which are disposed on the downstream side of the rotational direction of the supplying roller 51. The developer peeled off falls in the developing chamber 42, and is stirred and fed together with the developer circulated inside the developing chamber 40 and is attracted to the scooping pole S2 again, and then is conveyed by the supplying roller 51.

[Magnet Roller of Supplying Roller]

Figure 4:
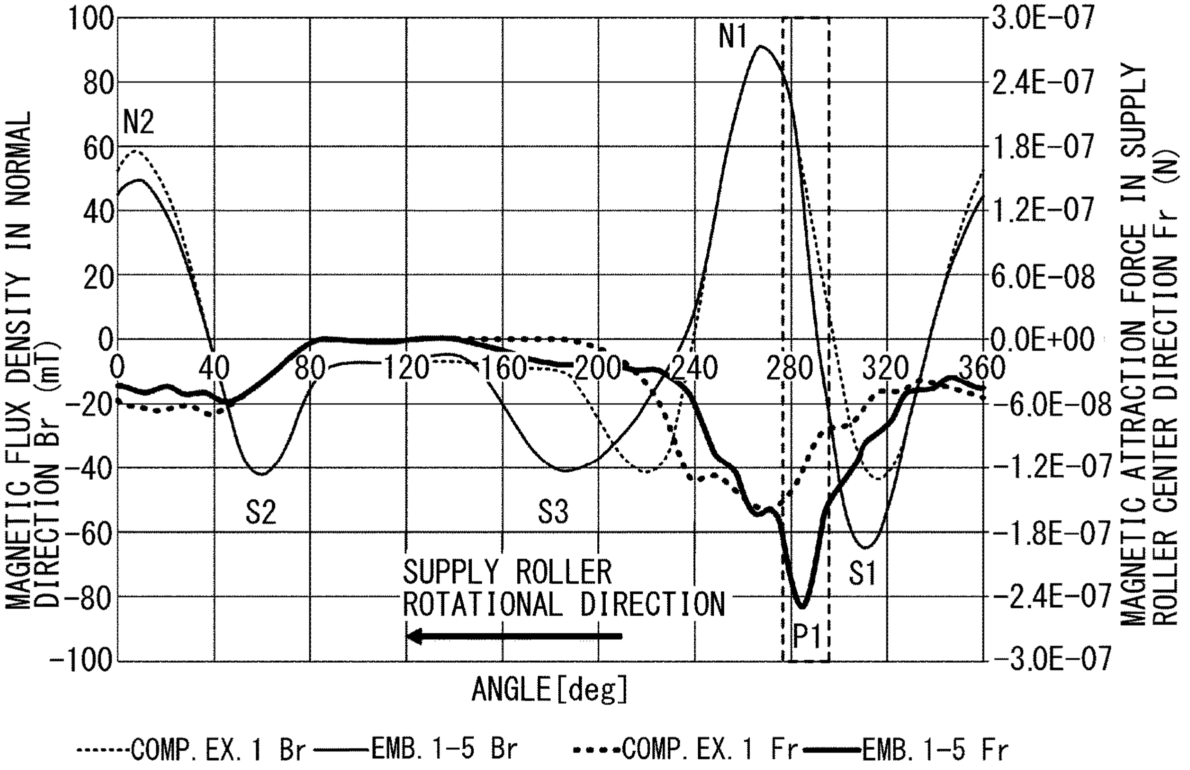
FIG. 4 is a graph showing a relationship between an angle of a supplying roller, a magnetic flux density Br in a normal direction, and a magnetic attraction force Fr in a supplying roller center direction, according to each of an embodiment 1 and a comparison example 1.

Next, an embodiment 1 using the supplying roller 1 including the magnet roller 51*a* with the main pole N1, the holding pole S1, the regulating pole N2, and the peeling pole S3 in this embodiment will be described with reference to FIG. 4 while being compared with a comparison example 1. FIG. 4 is a graph schematically showing a distribution of a magnetic flux density Br on the supplying roller 51 by the magnet roller 51*a*. Incidentally, the magnetic flux density Br accurately refers to a normal direction component of a magnetic flux density B normal to the surface of the supplying roller 51. Hereinafter, the "magnetic flux density Br in the normal direction" is simply called the "magnetic flux density" in accordance with the custom in some cases. In the case where the magnetic flux density is simply called the magnetic flux density, the magnetic flux density refers to the "magnetic flux density Br in the normal direction". The magnetic flux density Br of each of the magnet rollers (with respect to the normal direction) in the embodiment 1 and in the comparison example 1 was measured using a magnetic field measuring device ("MS-9902", manufactured by F.W. BELL) in which a distance between a probe which is a member of the magnetic field measuring device and the surface of the supplying roller 51 is of about 100 μm.

In FIG. 4, an a magnetic attraction force Fr by which the developer (carrier) is attracted in a center direction of the supplying roller 51 is also schematically shown together. The magnetic attraction force Fr of supplying roller 51 can be derived from the magnetic flux density Br in the normal direction and is represented by the following formula 1.

$$F_r = \frac{\mu - \mu_0}{\mu_0(\mu + 2\mu_0)} 2\pi b^3 \left( B_r \frac{\partial B_f}{\partial r} + B_\theta \frac{\partial B_\theta}{\partial r} \right) \quad \text{(formula 1)}$$

In the formula 1, μ represents (magnetic) permeability of a magnetic carrier, $\mu_0$ to represents space permeability, and b represents a radius of the magnetic carrier. The magnetic flux density Bθ at the surface of the supplying roller 51 is acquired from the following formula 2 by using a value of the magnetic flux density Br in the normal direction measured by the above-described method.

$$B_\theta = -\frac{\partial A_z(r, \theta)}{\partial r}\left(A_z(R, \theta) = \int_0^\theta RB_r d\theta\right) \quad \text{(formula 2)}$$

In FIG. 4, an a magnetic attraction force Fr, in a center direction of the supplying roller 5, acting on the carrier and calculated by the above-described formulas 1 and 2 is shown in a second axis. In the following the "magnetic attraction force Fr in the center direction of the supplying roller" is simply called the "magnetic attraction force" in some cases. That is, the "magnetic attraction force" refers to the "magnetic attraction force Fr in the center direction of the supplying roller".

Here, contribution of each of the magnet rollers to a carrier deposition phenomenon from the supplying roller 51 to the developing roller 50 will be described. As described above, the developing roller 50 includes the receiving pole S4 opposing the main pole N1 of the supplying roller 51. By these two magnetic poles, in the opposing portion P1 between the developing roller 50 and the supplying roller 51, the magnetic chains strong in constraint force are formed and are capable of collecting the toner remaining on the developing roller 50, so that an occurrence of a ghost phenomenon can be suppressed. The ghost phenomenon is a phenomenon such that a part of a development image in the last stage appears as an after-image (ghost) during subsequent development, i.e., a so-called phenomenon of hysteresis.

On the other hand, the magnetic constraint force is strong in the opposing portion P1, and therefore, stagnation of the developer occurs, and the carrier and the toner are transferred together onto the developing roller 50 and are conveyed to the developing region P2, so that a spot image defect such that the carrier is deposited on the photosensitive drum 1 and leads to a spot as a part of an image is liable to occur. Therefore, the receiving pole S4 on the supplying roller 51 side is disposed so that a peak of the magnetic flux density is positioned on a side upstream of a rectilinear line connecting rotation centers of the developing roller 50 and the supplying roller 51 with respect to the rotational direction of the developing roller 50.

That is, the receiving pole S4 is disposed so that a position of a maximum value of the magnetic flux density Br in the normal direction at the surface of the developing roller 50 (i.e., a peak position which is a position where the magnetic flux density Br in the normal direction at the surface of the developing roller 50 becomes maximum) is positioned on a side upstream, with respect to the rotational direction of the developing roller 50, of the rectilinear line connecting the rotation centers of the developing roller 50 and the supplying roller 51. By this, the magnetic chains are formed so as to be inclined toward the upstream side of the rotational direction of the developing roller 50. In this embodiment, the receiving pole S4 is disposed so that an angle thereof with respect to the rectilinear line connecting the above-described rotation centers is shifted toward the upstream side of the rotational direction of the developing roller 50 by about 1° or more and 10° or less, preferably about 3° or more and 7° or less, more preferably about 5°.

Further, the main pole N1 on the supplying roller 51 side is disposed so that a peak of the magnetic flux density is positioned on a side downstream of a rectilinear line connecting rotation centers of the developing roller 50 and the supplying roller 51 with respect to the rotational direction of the supplying roller 51. That is, the main pole N1 is disposed so that a position of a maximum value of the magnetic flux density Br in the normal direction at the surface of the supplying roller 51 (i.e., a peak position which is a position where the magnetic flux density Br in the normal direction at the surface of the supplying roller 51 becomes maximum) is positioned on a side downstream, with respect to the rotational direction of the supplying roller 51, of the rectilinear line connecting the rotation centers of the developing roller 50 and the supplying roller 51. By this, the magnetic chains are formed so as to be inclined toward the downstream side of the rotational direction of the supplying roller 51. In this embodiment, the main pole N1 is disposed so that an angle thereof with respect to the rectilinear line connecting the above-described rotation centers is shifted toward the upstream side of the rotational direction of the supplying roller 51 by about 6° or more and 22° or less, preferably about 10° or more and 18° or less, more preferably about 14°.

Thus, either one or both of the receiving pole S4 of the developing roller 50 and the main pole N1 of the supplying roller 51 are disposed so as to be inclined, so that the magnetic chains formed between the developing roller 50 and the supplying roller 51 are inclined toward the downstream side of the rotational direction of the supplying roller 51. By this, the developer conveyed from the upstream side of the rotational direction of the supplying roller 51 is easily introduced into the opposing portion P1 between the developing roller 50 and the supplying roller 51. Accordingly, the stagnation of the developer in the opposing portion P1 is eliminated, whereby conveyance of the developer including the carrier to the developing roller 50 is suppressed, so that a lowering in quality of the image to be formed can be suppressed.

In recent years, speed-up of the image forming apparatus advances, and with this, rotational speeds of the supplying roller 51 and the developing roller 50 become fast. For this reason, the carrier is liable to fly from the conveyed developer on the upstream side of the rotational direction of the supplying roller 51, so that there is a liability that the carrier is transferred onto the developing roller 50 and conveyed to the developing region P2 and thus a dot image defect is liable to occur. In this embodiment, by the following constitution, the magnetic attraction force Fr is made strong in a region from the opposing portion P1 between the developing roller 50 and the supplying roller 51 to an upstream portion thereof and thus carrier deposition is suppressed.

Specifically, in this embodiment, an absolute value |Br| of a maximum value (largest value) of the magnetic flux density in the normal direction at the surface of the supplying roller 51 is made larger at the holding pole S1 than at the regulating pole N2 and is made larger at the main pole N1 than at the holding pole S1. That is, a magnitude of the absolute value |Br| of the magnetic flux density was set to satisfy (main pole N1)>(holding pole S1)>(regulating pole N2).

A result of measurement the absolute value |Br| of the maximum value of the magnetic flux density in the normal direction for each of magnetic poles in embodiments 1-1 to 1-5 in which the above-described relationship in this embodiment (first embodiment) is satisfied and a comparison example 1 in which the above-described relationship in this embodiment is not satisfied is shown in a table 1 below, and an inter-pole angle for each of the magnetic poles in the embodiments 1-1 to 1-5 and the comparison example 1 are shown in a table 2 below. Incidentally, the inter-pole angle is an angle, with respect to the rotational direction of the supplying roller 51, between positions (peak positions) of maximum values of the magnetic flux density in the normal direction of adjacent magnetic poles.

TABLE 1

| (unit: mT) | | | | | | | |
|---|---|---|---|---|---|---|---|
| | DR*[1] | SUPPLYING ROLLER | | | | | TR*[2] |
| | S4 | N1 | S1 | N2 | N2 | S3 | CD*[3] |
| EMB. 1-1 | 40 | 90 | 65 | 50 | 42 | 41 | ○ |
| EMB. 1-2 | 40 | 90 | 65 | 40 | 42 | 41 | ○ |
| EMB. 1-3 | 40 | 90 | 43 | 50 | 42 | 41 | ○ |
| EMB. 1-4 | 40 | 90 | 43 | 50 | 42 | 41 | ○ |
| EMB. 1-5 | 40 | 90 | 65 | 50 | 42 | 41 | ◎ |
| COMP.EX. 1 | 40 | 90 | 43 | 59 | 42 | 41 | X |

*[1]"DR" is the developing roller.
*[2]"TR" is a test result.
*[3]"CD" is a carrier deposition.

TABLE 2

| (unit: degrees) | | | | | |
|---|---|---|---|---|---|
| | (N1-S1) | (S1-N2) | (N2-S2) | (S2-S3) | (S3-N1) |
| EMB. 1-1 | 47 | 52 | 52 | 159 | 50 |
| EMB. 1-2 | 47 | 52 | 52 | 159 | 50 |
| EMB. 1-3 | 42 | 57 | 52 | 159 | 50 |
| EMB. 1-4 | 47 | 52 | 52 | 126 | 83 |
| EMB. 1-5 | 42 | 57 | 52 | 126 | 83 |
| COMP.EX. 1 | 47 | 52 | 52 | 159 | 50 |

As shown in the tables 1 and 2, the embodiments 1-1 and 1-2 are constituted so that the magnitude of the absolute value |Br| of the magnetic flux density in the normal direction satisfies the relationships of (main pole N1)>(holding pole S1)>(regulating pole N2) and (holding pole S1)>(peeling pole S3). That is, the absolute value of the maximum value of the magnetic flux density in the normal direction at the surface of the supplying roller 51 is larger at the holding pole S1 than at the regulating pole N2 and is larger at the main pole N1 than at the holding pole S1. Further, the absolute value of the maximum value of the magnetic flux density is larger at the holding pole S1 upstream of the main pole N1 than at the peeling pole S3 as a downstream pole of the main pole N1.

Further, the embodiment 1-3 is constituted so that inter-pole angle between the main pole N1 and the holding pole S1 becomes smaller than in the comparison example 1. Further, the embodiment 1-4 is constituted so that the inter-pole angle between the main pole N1 and the holding pole S1 is smaller than the inter-pole angle between the main pole N1 and the peeling pole S3. That is, the position (peak position) of the maximum value of the magnetic flux density Br in the normal direction at the surface of the supplying roller 51 for the main pole N1 is taken as a first position. The peak position for the holding pole S1 is taken as a second position. The peak position for the regulating pole N2 is taken as a third position. In this case, with respect to the rotational direction of the supplying roller 51, an angle between the second position (peak position for the holding pole S1) and the first position (peak position for the main pole N1) is smaller than an angle between the second position (peak position for the holding pole S1) and the third position (peak position for the regulating pole N2).

Further, the embodiment 1-5 is constituted so that the magnitude of the absolute value |Br| of the magnetic flux density in the normal direction satisfies the relationships of (main pole N1)>(holding pole S1)>(regulating pole N2) and (holding pole S1)>(peeling pole S3). Further, the embodiment 1-5 is constituted so that the inter-pole angle between the main pole N1 and the holding pole S1 is smaller than the intermediary-pole angle between the holding pole S1 and the regulating pole N2 and than the inter-pole angle between the main pole N1 and the peeling pole S3. That is, the peak position for the peeling pole S3 is taken as a fourth position. In this case, with respect to the rotational direction of the supplying roller 51, an angle between the second position (peak position for the holding pole S1) and the first position (peak position for the main pole N1) is smaller than an angle between the second position (peak position for the holding pole S1) and the third position (peak position for the regulating pole N2) and is smaller than an angle between the first position (peak position for the main pole N1) and the fourth position (peak position for the peeling pole S3).

In FIG. 4, the magnetic flux density Br (slid line) in the embodiment 1-5 in which a carrier deposition suppressing effect is highest, and the magnetic flux density Br (broken line) in the comparison example 1 are shown. Further, the magnetic attraction force Fr (bold solid line) in the embodiment 1-5, and the magnetic attraction force Fr (bold broken line) in the comparison example 1 are also shown in FIG. 4. A frame enclosed by a broken line represents a position of the opposing portion P. Further, in FIG. 4, as indicated by an arrow, a direction from a right side toward a left side of the abscissa is the rotational direction of the supplying roller 51, and in the following description, "upstream" and "downstream" which are simply mentioned refer to "upstream" and "downstream", respectively, with respect to the rotational direction of the supplying roller 51.

Further, each of developing devices having the constitution of the embodiments 1-1 to 1-5 and the comparison example 1 was incorporated in the image forming apparatus as shown in FIG. 1 and was subjected to evaluation of an image forming performance by outputting a test image in actuality, followed by observation of occurrence or non-occurrence of the carrier deposition on the test image through eyes. A test result thereof is shown in the above-described table 1. In the table 1, the case where the carrier deposition did not occur on the image was evaluated as "◎", the case where the carrier deposition was hard to occur (i.e., the case where the carrier deposition occurred to the extent that a degree thereof does not have the influence on an image quality was evaluated as "○", and the case where the carrier deposition occurred on the image was evaluated as "x").

A developing condition was such that the peripheral speed of the photosensitive drum 1 was 450 mm/sec and the dark-portion potential of the surface potential of the photosensitive drum 1 was 350 V. Further, as regards the developing roller 50, an AC bias Vpp was 1.6 kV, a frequency was 4 kHz, a duty ratio was 30%, and a DC bias Vdc was 30 V. Further, as regards the supplying roller 51, an AC bias Vpp was 0.4 kV, a frequency was 4 kHz, a duty ratio was 70%, and a DC bias Vdc was 300 V.

As another condition, a gap between the developing roller 50 and the supplying roller 51 was 300 μm, a peripheral speed ratio of the supplying roller 51 to the developing roller 50 was 1.5 times, and a peripheral speed ratio of the developing roller 50 to the photosensitive drum 1 was 1.5 times.

As shown in the tables 1 and 2, in the comparison example 1, the relationship in magnitude of the absolute value |Br| of the magnetic flux density of the magnet roller 51*a* of the supplying roller 51 is constituted so as to satisfy (main pole N1)>(holding pole S1) and (regulating pole N2)<(holding pole S2). Further, the peeling in peak position of the magnetic flux density is constituted so that the inter-pole angle between the main pole N1 and the holding pole S1 provides an angular difference of 5° or less between itself and each of the inter-pole angle between the holding pole S1 and the regulating pole n2 and the inter-pole angle between the main pole N1 and the peeling pole S3. Further, with respect to a closest position between the developing roller 50 and the supplying roller 51, the peak position of the magnetic flux density of the main pole N1 was set at a position downstream by 16° with respect to the rotational direction of the supplying roller 51, and the peak position of the magnetic flux density of the receiving pole S4 of the magnet roller 60*b* in the developing roller 50 was set at a position on the upstream side of the rotational direction of the developing roller 50 by 5°.

As shown in FIG. 4, when compared with the embodiment 1-5, the magnetic attraction force Fr of the carrier is small as a whole in a region from the opposing portion P1 toward the upstream side of the rotational direction of the supplying roller 51. When the magnetic attraction force Fr is small in this region, a centrifugal force with rotation of the supplying roller 51 overcomes the magnetic attraction force Fr, so that the carrier is liable to fly from the conveyed developer on the upstream side of the rotational direction of the supplying roller 51. For that reason, there is a liability that the dot image defect due to the carrier deposition is liable to occur. As is apparent from the table 1, in the comparison example 1 in which the magnetic attraction force Fr is small in the region from the opposing portion P1 toward the upstream side of the rotational direction of the supplying roller 51, the carrier deposition on the image occurred.

On the other hand, in the embodiments 1-1 to 1-5, the carrier deposition did not occur or was hard to occur. The reason why the degree of the carrier deposition was improved would be considered as follows. That is, the magnetic attraction force Fr by which the carrier was attracted toward the center of the supplying roller 51 is constituted by the product of the magnitude of the magnetic flux density Br and a change (partial differentiation) thereof with respect to an r direction (normal direction) (see, the above-described formula 1).

From the above-described tables 1 and 2, the magnitude of the absolute value |Br| of the magnetic flux density in the normal direction in each of the embodiments 1-1 and 1-2 is made to satisfy the relationship of (magnetic N1)>(holding pole S1)>(regulating pole N1), whereby lines of magnetic flux becomes easy to extent toward the main pole N1 large in absolute value |Br| of the magnetic flux density. Further, by satisfying the relationship of (holding pole S1)>(peeling pole S3), lines of magnetic flux of the main pole N1 becomes easy to extend the holding pole S1 large in absolute value |Br| of the magnetic flux density Br. As a result, in the embodiments 1-1 and 1-2, compared with the comparison example 1, the lines of magnetic flux concentrate between the main pole N1 and the holding pole S1, and thus the magnetic flux density Br easily becomes large and the magnetic attraction force Fr consisting of the product thereof and the change thereof with respect to the r direction easily becomes large.

Further, a magnetic flux density distribution of the main pole N1 in the embodiment 1-3 has a shape such that the peak position of the magnetic flux density of the holding pole S1 is close to the peak position of the magnetic flux density of the main pole N1 and that the magnetic flux density abruptly increases from the holding pole S1 toward the main pole N1 (i.e., a slope is large) more than in the comparison example 1. In a region where the magnetic flux density abruptly changes, the change (partial differentiation) thereof with respect to the r direction also easily becomes large. As a result, the embodiment 1-3 is unchanged from the comparison example 1 in absolute value of the magnetic flux density, but is smaller in inter-pole angle between the main pole N1 and the holding pole S1 than in the comparison example 1, and therefore, the change (partial differentiation) thereof with respect to the r direction easily becomes larger and the magnetic attraction force Fr consisting of the product thereof and the magnitude of the magnetic flux density easily becomes larger than in the comparison example 1.

Further, the magnetic flux density distribution of the main pole N1 in the embodiment 1-4 is such that the peak position of the magnetic flux density of the holding pole S1 is closer to the peak position of the main pole N1 than the peak position of the peeling pole S3 is, so that the lines of magnetic flux are easier to extend toward the holding pole S1 than in the comparison example 1. As a result, in the embodiment 1-4, compared with the comparison example 1, the lines of magnetic flux concentrate between the main pole N1 and the holding pole S1, and thus the magnetic flux density Br easily becomes large and the magnetic attraction force Fr consisting of the product thereof and the change thereof with respect to the r direction easily becomes large.

Particularly, in the embodiment 1-5 in which the carrier deposition did not occur on the image at all, the magnitude of the absolute value |Br| of the magnetic flux density of the magnet roller 51*a* is made to satisfy a relationship of (main pole N1)>(holding pole S1)>(regulating pole N2) and a relationship of (holding pole S1)>(peeling pole S3), and the inter-pole angle between the main pole N1 and the holding pole S1 is made smaller than the inter-pole angle between the main pole N1 and the peeling pole S3, so that the lines of the magnetic flux concentrate between the main pole N1 and the holding pole S1 and thus the magnetic flux density easily becomes large. Further, the inter-pole angle between the main pole N1 and the holding pole S1 is made smaller than the inter-pole angle between the holding pole S1 and the regulating pole N2, so that the magnetic flux density more abruptly changes than in the comparison example 1, and therefore, the change (partial differentiation) with respect to the r direction easily becomes large. As a result, the magnetic attraction force Fr consisting of the product of the magnitude of the magnetic flux density and the change (partial differentiation) thereof with respect to the r direction easily becomes large.

In actuality, as shown in FIG. 4, it is understood that in a portion where a change (slope) of the magnetic flux density Br with respect to a θ direction (circumferential direction) in a region from the opposing portion P1 between the developing roller 50 and the supplying roller 51 toward the upstream side of the rotational direction of the supplying roller 51, the magnetic attraction force Fr also becomes larger in the embodiment 1-5 than in the comparison example 1.

From the above, the magnitude of the absolute value |Br| of the magnetic flux density of the magnet roller 51*a* of the supplying roller 51 is made to satisfy the relationship of (main pole N1)>(holding pole S1)>(regulating pole N2) and the relationship of (holding pole S1)>(peeling pole S3), so that the magnetic flux density Br between the main pole N1 and the holding pole S1 is made large. Further, the inter-pole angle between the main pole N1 and the holding pole S1 is made smaller than the inter-pole angle between the holding pole S1 and the regulating pole N2 and than the inter-pole angle between the main pole N1 and the peeling pole S3, whereby the change (slope) of the magnetic flux density Br with respect to the θ direction is made large. By this, the magnetic attraction force Fr in the region from the opposing portion P1 toward the upstream side of the rotational direction of the supplying roller 51 becomes large, so that the carrier deposition onto the developing roller 50 can be suppressed.

Here, the magnitudes of the magnetic flux density Br of the respective agnetic poles may desirably provide a difference of 5 mT or more, preferably 10 mT or more, more preferably 15 mT or more. Particularly, the absolute value |Br| of the maximum value (largest value) of the magnetic flux density in the normal direction at the surface of the supplying roller 51 may desirably be larger for the main pole N1 than for the holding pole S1 by 5 mT or more, preferably 10 mT or more, more preferably 15 mT or more. Further, the absolute value |Br| of the maximum value of the magnetic flux density may desirably be larger for the holding pole S1 than for the regulating pole N2 by 5 mT or more, preferably 10 mT or more, more preferably 15 mT or more. Further, the absolute value |Br| of the maximum value of the magnetic flux density may desirably be larger for the holding pole S1 than for the peeling pole S3 by 5 mT or more, preferably 10 mT or more, more preferably 15 mT or more. This is because inversion in magnitude relationship of the absolute value |Br| of the magnetic flux density between the magnetic poles due to a part tolerance of the magnet roller 51*a* is prevented.

Further, the difference between the inter-pole angle between the main pole N1 and the holding pole S1 and the inter-pole angle between the holding pole S1 and the regulating pole N2 may desirably be made 10° or more, preferably 15° or more, more preferably 20° or more. That is, the angle between the second position (peak position of the holding pole S1) and the first position (peak position of the main pole N1) may desirably be smaller than the angle between the second position (peak position of the holding pole S1) and the third position (peak position of the regulating pole N2) by 10° or more, preferably 15° or more, more preferably 20° or more. By this, a sufficient magnetic attraction force Fr can be obtained.

Further, the difference between the inter-pole angle between the main pole N1 and the holding pole S1 and the inter-pole angle between the main pole N1 and the peeling pole S2 may desirably be made 10° or more, preferably 15° or more, more preferably 20° or more. That is, the angle between the first position (peak position of the main pole N1) and the second position (peak position of the holding pole S1) may desirably be smaller than the angle between the first position (peak position of the main pole N1) and the fourth position (peak position of the peeling pole S3) by 10° or more, preferably 15° or more, more preferably 20° or more. By this, a sufficient magnetic attraction force Fr can be obtained.

Incidentally, the magnetic flux density and the arrangement angle of the magnet roller 51*a*, on the supplying roller 51 side, including the main pole N1, the holding pole S1, and the regulating pole N2 can be appropriately set depending on specifications of the developing device.

That is, it is only required that the magnetic attraction force Fr can be made strong in the region from the opposing portion P1 between the developing roller 50 and the supplying roller 51 toward the upstream portion thereof, and in order to strengthen the magnetic attraction force Fr, the magnetic flux density Br may be made large or the change (partial differentiation) of the magnetic attraction force Fr with respect to the r direction may be made large.

Second Embodiment

A second embodiment will be described using FIGS. 5 and 6 while making reference to FIG. 3. In this embodiment, a magnetic flux density distribution of the holding pole S1 is changed from the first embodiment. Other constitutions and actions are similar to those in the first embodiment, and therefore, the similar constitutions are omitted from description and illustration or briefly described by adding the same reference numerals or symbols, and in the following, a difference from the first embodiment will be principally described.

Also, in the case of this embodiment, the magnitude of the absolute value |Br| of the maximum value (largest value) of the magnetic flux density satisfies the relationship of (main pole N1)>(holding pole S1)>(regulating pole N2) similarly as in the first embodiment. On the other hand, in this embodiment, different from the first embodiment, the distribution of the magnetic flux density Br of the holding pole S1 in the normal direction at the surface of the supplying roller 51 has a shape such that in the case where a position where the magnetic flux density becomes maximum (largest) is a first holding pole position and a position where the magnetic flux density is 50% of the maximum value (largest value) is a second holding pole position and a third holding pole position, the first holding pole position is positioned on a side downstream of a middle position between the second holding pole position and the third holding pole position with respect to the regulating pole of the supplying roller 51.

In other words, in the case of this embodiment, the shape of the distribution of the magnetic flux density Br was made asymmetrical so that in the holding pole S1, an absolute value |ΔBr| of a change amount of Br per angle of 1 degree is larger on a downstream side than on an upstream side with respect to the rotational direction of the supplying roller 51. In the following, embodiments 2-1 and 2-2 in which such a magnetic flux density relationship in this embodiment is satisfied will be specifically described. Incidentally, in the following description, "upstream" and "downstream" simply mentioned refer to "upstream" and "downstream", respectively, with respect to the rotational direction of the supplying roller 51.

First, in the embodiment 2-1, |ΔBr| at a point where the magnetic flux density Br becomes 0 on an upstream side of the holding pole S1 was 1.5 mT/deg on the upstream side and 2.6 mT/deg on the downstream side. A magnitude of the absolute value |Br| of the magnetic flux density was 90 mT for the main pole N1, 43 mT for the holding pole S1, 40 mT for the regulating pole N2, 42 mT for the scooping pole S2, and 41 mT for the peeling pole S3. A peak position relationship of the magnetic flux density was such that the inter-pole angle between the main pole N1 and the holding pole S1 is 42°, the inter-pole angle between the holding pole S1 and the regulating pole N2 is 61°, the inter-pole angle between the regulating pole N2 and the scooping pole S2 is 48°, the inter-pole angle between the scooping pole S2 and the peeling pole S3 is 126°, and the inter-pole angle between the main pole N1 and the peeling pole S3 is 83°.

Next, in the embodiment 2-2, a magnitude of the absolute value |Br| of the magnetic flux density is constituted so as to satisfy the relationship of (holding pole S1)>(peeling pole S3) similarly as in the embodiment 1-5 described in the first embodiment. Further, |ΔBr| at a point where the magnetic flux density Br becomes 0 on an upstream side of the holding pole S1 was 2.1 mT/deg on the upstream side and 4.0 mT/deg on the downstream side. A peak position relationship of the magnetic flux density was such that the inter-pole angle between the main pole N1 and the holding pole S1 is 39°, the inter-pole angle between the holding pole S1 and the regulating pole N2 is 64°, the inter-pole angle between the regulating pole N2 and the scooping pole S2 is 48°, the inter-pole angle between the scooping pole S2 and the peeling pole S3 is 126°, and the inter-pole angle between the main pole N1 and the peeling pole S3 is 83°.

Further, in each of the embodiments 2-1 and 2-2, with respect to the closest position between the developing roller 50 and the supplying roller 51, the peak position of the magnetic flux density of the main pole N1 was set at 16° on a is downstream side of the rotational direction of the supplying roller 51, and the peak position of the magnetic flux density of the receiving pole S4 of the magnet roller 60*b* of the developing roller 50 was set at 5° on the upstream side of the rotational direction of the developing roller 50.

Figure 5:
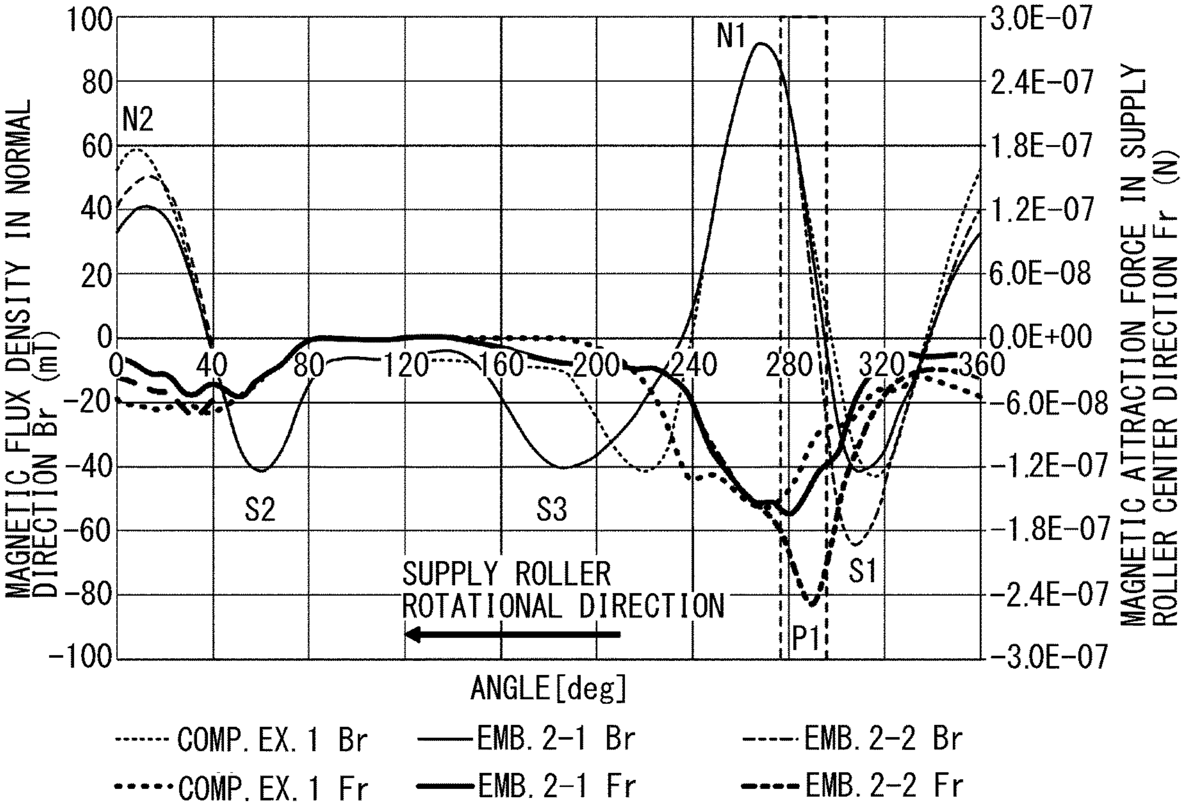
FIG. 5 is a graph showing the relationship between the angle of the supplying roller, the magnetic flux density in the normal direction, and the magnetic attraction force Fr in the supplying roller center direction, according to each of an embodiment 2 and the comparison example 1.

FIG. 5 shows the magnetic flux density Br (solid line) in the embodiment 2-1, the magnetic flux density Br (chain double-dashed line) in the embodiment 2-2, and the magnetic flux density Br (dotted line) in the comparison example 1. Further, the magnetic attraction forces Fr in the embodiments 2-1 and 2-2 and the comparison example 1 are also shown together by associated bold lines, respectively. Further, in FIG. 5, as indicated by an arrow, a direction from a right side toward a left side of the abscissa is the rotational direction of the supplying roller 51.

In the embodiment 2-1, compared with the comparison example 1, the absolute value |ΔBr| of the change amount of Br of the holding pole S1 on the downstream side of the rotational direction of the supplying roller 51 is made large, whereby the magnetic flux density between the main pole N1 and the holding pole S1 abruptly changes more than the comparison example 1, and therefore, the change (partial differentiation) with respect to the r direction easily becomes large. As a result, the magnetic attraction force Fr consisting of the product of the magnitude of the magnetic flux density and the change (partial differentiation) thereof with respect to the r direction easily becomes large, so that the magnetic attraction force Fr in the region from the opposing portion P1 toward the upstream side of the rotational direction of the supplying roller 51 becomes large and thus the carrier deposition onto the developing roller 50 can be suppressed.

In the embodiment 2-2, compared with the comparison example 1, the absolute value |ΔBr| of the magnetic flux density is made to satisfy the relationship of (main pole N1)>(holding pole S1)>(regulating pole N2) and the relationship of (holding pole S1)>(peeling pole S3), so that the lines of magnetic flux concentrate between the main pole N1 and the holding pole S1 and thus the magnetic flux density easily becomes large. Further, the absolute value |ΔBr| of the change amount of Br of the holding pole S1 on the downstream side of the rotational direction of the supplying roller 51 is made large, whereby the magnetic flux density between the main pole N1 and the holding pole S1 abruptly changes more than the comparison example 1, and therefore, the change (partial differentiation) with respect to the r direction easily becomes large. As a result, the magnetic attraction force Fr consisting of the product of the magnitude of the magnetic flux density and the change (partial differentiation) thereof with respect to the r direction easily becomes large.

In actuality, as shown in FIG. 5, it is understood that in a portion where a change (slope) of the magnetic flux density Br in θ direction in the region from the opposing portion P1 between the developing roller 50 and the supplying roller 51 toward the upstream side of the rotational direction of the supplying roller 51 is large, the magnetic attraction force Fr also becomes larger in the embodiments 2-1 and 202 than in the comparison example 1. Further, it is understood that in the embodiment 2-2 in which the magnitude of the absolute value |Br| of the magnetic flux density satisfies the relationship of (main pole N1)>(holding pole S1)>(regulating pole N2) and the relationship of (holding pole S1)>(peeling pole S3), compared with the embodiment 201, the magnetic flux density Br between the main pole N1 and the holding pole S1 is large, and the magnetic attraction force Fr consisting of the above-described product also becomes large. For that reason, compared with the embodiment 2-1, in the embodiment 2-2, the carrier deposition onto the developing roller 50 can be more effectively suppressed.

Here, the asymmetrical shape of the magnetic flux density Br of the holding pole S1 in this embodiment will be described using FIG. 6. FIG. 6 is an enlarged view of the magnetic flux density Br in the embodiment 2-2 shown in FIG. 5 at a periphery of the holding pole S1.

Figure 6:
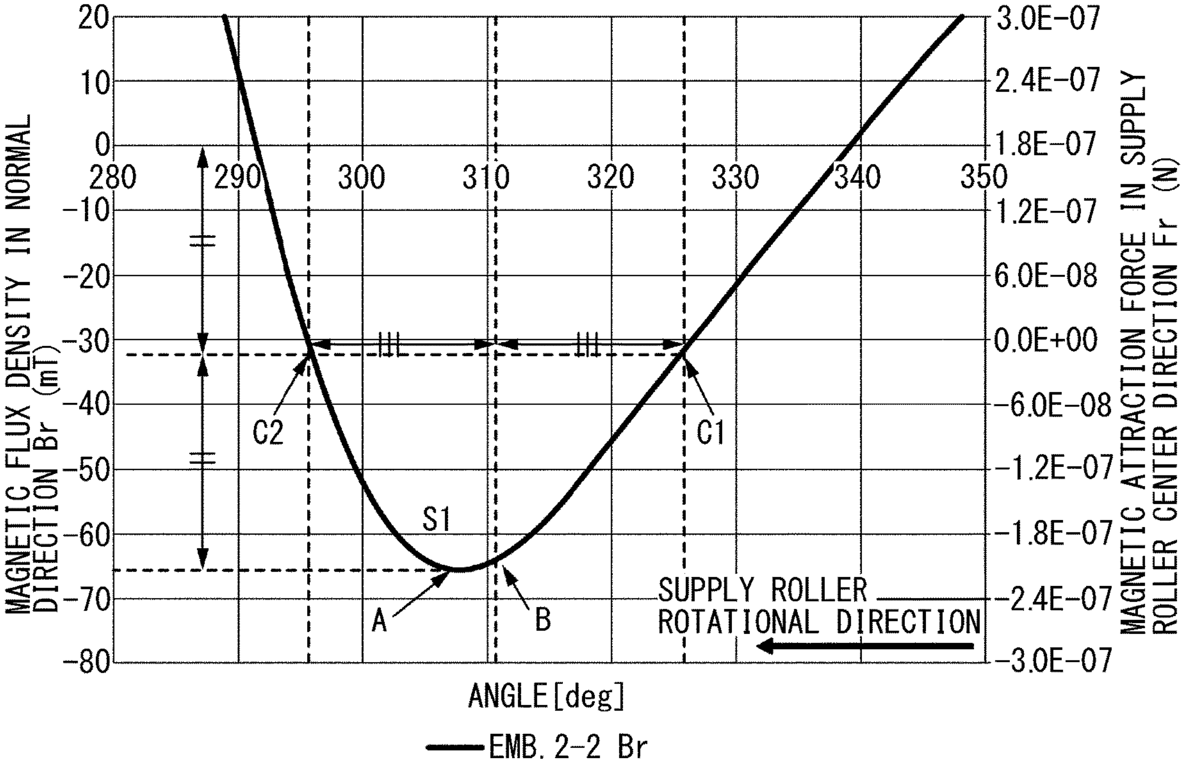
FIG. 6 is a graph showing a relationship between an angle at a periphery of a holding pole S1 of the supplying roller and the magnetic flux density Br in the normal direction, according to the embodiment 2.

In FIG. 6, a point A represents a position (first holding pole position) where the magnitude of the magnetic flux density Br of the holding pole S1 becomes maximum. A point B represents a middle position between a position of a point C1 (second holding pole position) where the magnetic flux density Br is 50% (half value) of the magnetic flux density Br at the point A and a position of a point C2 (third holding pole position) where the magnetic flux density Br is 50% of the magnetic flux density Br at the point A. In this embodiment, the position of the point A is positioned on a side downstream of the position of the point B with respect to the rotational direction of the rotational direction of the supplying roller 51, so that the distribution of the magnetic flux density Br of the holding pole S1 is asymmetrical.

A difference in angle between the point A and the point B may desirably be 3° or more, preferably 4° or more, more preferably 5° or more. That is, the first holding pole position (point A) may desirably be positioned on a side downstream of the middle position (point B) with respect to the rotational direction of the supplying roller 51 by 3° or more, preferably 4° or more, more preferably 5° or more.

Further, it is desirable that a pole position difference between the point A of the holding pole S1 and a position (peak position) where the magnetic flux density of the regulating pole N2 becomes maximum may desirably be larger than a pole position difference between the point A of the holding pole S1 and a position (peak position) where the magnetic flux density of the main pole N1 becomes maximum by 10° or more, preferably 15° or more, more preferably 20° or more. This is because the magnetic flux density Br of the holding pole S1 is made asymmetrical even in a part tolerance range of the magnet roller.

Table 3 below shows a result of measurement of the absolute value [Br] of the maximum value of the magnetic flux density in the normal direction for the magnetic poles in the embodiments 2-1 and 2-2 and the comparison example 1, and the inter-pole angle between each of adjacent magnetic poles in the embodiments 2-1 and 2-2 and the comparison example 1. Further, each of developing devices having the constitution of the embodiments 2-1 and 2-2 and the comparison example 1 was incorporated in the image forming apparatus as shown in FIG. 1 and was subjected to evaluation of an image forming performance by outputting a test image in actuality, followed by observation of occurrence or non-occurrence of the carrier deposition on the test image through eyes. A test result thereof is shown in the above-described table 3. An evaluation condition was the same as the evaluation condition described with reference to the table 1. In the table 3, the case where the carrier deposition did not occur on the image was evaluated as "◎", the case where the carrier deposition was hard to occur (i.e., the case where the carrier deposition occurred to the extent that a degree thereof does not have the influence on an image quality was evaluated as "○", and the case where the carrier deposition occurred on the image was evaluated as "x").

TABLE 3

(unit: mT)

| | SUPPLYING ROLLER | | | | | | | |
|---|---|---|---|---|---|---|---|---|
| | MFD*1 (mT) | | | | | PPR*2 (° C.) | | TR*3 |
| | N1 | S1 | N2 | S2 | S3 | (N1-S1) | (S1-N2) | CD*4 |
| EMB. 2-1 | 90 | 43 | 40 | 42 | 41 | 42 | 61 | ○ |
| EMB. 2-2 | 90 | 65 | 50 | 42 | 41 | 42 | 61 | ◎ |
| COMP.EX. 1 | 90 | 43 | 59 | 42 | 41 | 47 | 52 | X |

*1"MFD" is the magnetic flux density in the normal direction.

*2"PPR" is a peak position relationship (inter-pole angle) between adjacent magnetic poles.

*3"TR" is the test result.

*4"CD" is the carrier deposition.

From the table 3, it was able to be confirmed that in the embodiments 2-1 and 2-2, compared with the comparison example 1, the degree of the carrier deposition is reduced by making the shape of the distribution of the magnetic flux density Br of the holding pole S1 asymmetrical so as to be larger on the downstream side than on the upstream side of the rotational direction of the supplying roller 51. Further, in the embodiment 2-2, the magnitude of the absolute value |Br| of the magnetic flux density satisfies the relationship of (main pole N1)>(holding pole S1)>(regulating pole N2) and the relationship of (holding pole S1)>(peeling pole S3), whereby it was able to be confirmed that the magnetic attraction force Fr in the region from the opposing portion P1 toward the upstream side of the rotational direction of the supplying roller 1 becomes larger than in the embodiment 2-1 and thus the degree of the carrier deposition is further suppressed.

Incidentally, the magnetic flux density and the arrangement angle of the magnet roller 61*a*, of the supplying roller 51, including the main pole N1, the holding pole S1, and the regulating pole N2 can be appropriately set depending on the specifications of the developing device.

Third Embodiment

A third embodiment will be described using FIG. 7 while making reference to FIG. 3. In this embodiment, the magnitude of the absolute value |Br| of the magnetic flux density is changed so as to satisfy a relationship of (holding pole S1)>(regulating pole N2)>(scooping pole S2). Other constitutions and actions are similar to those in the first embodiment, and therefore, the similar constitutions are omitted from description and illustration or briefly described by adding the same reference numerals or symbols, and in the following, a difference from the first embodiment will be principally described.

In this embodiment, as the regulating blade 52, a regulating blade formed only with a magnetic member was used. For that reason, there is a liability of developer deterioration, but the developer deterioration can be suppressed by use of the magnetic member in combination with a magnet roller 51*a* in this embodiment. However, similarly as in the first embodiment, the regulating blade 52 may be the magnetic member or a non-magnetic member.

Next, an embodiment 1 using the supplying roller 1 including the magnet roller 51*a* with the scooping pole S2, the regulating pole N2, and the holding pole S1 in this embodiment will be described with reference to FIG. 7 while being compared with a comparison examples 2 and 3. FIG. 7 is a graph schematically showing a distribution of a magnetic flux density Br on the supplying roller 51 by the magnet roller 51*a*. Incidentally, the magnetic flux density Br accurately refers to a normal direction component of a magnetic flux density B normal to the surface of the supplying roller 51. Hereinafter, the "magnetic flux density Br in the normal direction" is simply called the "magnetic flux density" in accordance with the custom in some cases. In the case where the magnetic flux density is simply called the magnetic flux density, the magnetic flux density refers to the "magnetic flux density Br in the normal direction". The magnetic flux density Br of each of the magnet rollers (with respect to the normal direction) in the embodiment 1 and in the comparison example 1 was measured using a magnetic field measuring device ("MS-9902", manufactured by F.W. BELL) in which a distance between a probe which is a member of the magnetic field measuring device and the surface of the supplying roller 51 is of about 100 μm.

In FIG. 4, a magnetic attraction force Fr by which the developer (carrier) is attracted in a center direction of the supplying roller 51 is also schematically shown together.

Here, contribution of each of the magnet rollers to a carrier deposition phenomenon from the supplying roller 51 to the developing roller 50 and the developer deterioration in the developing device 4 will be described. As described above, the developing roller 50 includes the receiving pole S4 opposing the main pole N1 of the supplying roller 51. By these two magnetic poles, in the opposing portion P1 between the developing roller 50 and the supplying roller 51, the magnetic chains strong in constraint force are formed and are capable of collecting the toner remaining on the developing roller 50, so that an occurrence of a ghost phenomenon can be suppressed. The ghost phenomenon is a phenomenon such that a part of a development image in the last stage appears as an after-image (ghost) during subsequent development, i.e., a so-called phenomenon of hysteresis.

On the other hand, the magnetic constraint force is strong in the opposing portion P1, and therefore, there is a liability that the carrier flies from the developer conveyed toward the upstream side of the rotational direction of the supplying roller 51 and is transferred onto the developing roller 50 and then is conveyed to the developing region P2. When the carrier is conveyed to the developing region P2, an image defect such that the carrier is deposited on the photosensitive drum 1 and results in spots in a part of the image is liable to occur. Therefore, on a side upstream of the main pole N1 with respect to the rotational direction of the supplying roller 51, the holding pole S1 which has the same polarity as the receiving pole S4 of the developing roller 50 and which is large in magnetic flux density is provided, so that the magnetic attraction force Fr is kept strong from the opposing portion P1 to the upstream portion thereof and thus transfer of the carrier to the developing roller 50 is suppressed. At this time, when the magnetic flux density of the holding pole S1 is made smaller than the magnetic flux density of the main pole N1 and made larger than the magnetic flux density of the receiving pole S4, occurrences of the carrier deposition and the ghost phenomenon can be effectively suppressed.

In recent years, speed-up of the image forming apparatus advances, and with this, rotational speeds of the supplying roller 51 and the developing roller 50 become fast. For this reason, the carrier in the developer is liable to fly from the developing roller 50. Therefore, the magnetic flux densities of the holding pole S1 and the main pole N1 are made large. When the magnetic flux density of the holding pole S1 becomes large, correspondingly, the magnetic attraction force Fr increases also on the upstream side of the rotational direction of the supplying roller 51. As described above, when the magnetic attraction force Fr is large in the opposing region between the regulating blade 52 and the supplying roller 51, the developer constrained by the supplying roller 51 is liable to deteriorate by rubbing with the regulating blade 52.

Here, the developer deterioration means deterioration of the developer with drive of the developing device 4 while rotating the supplying roller 51, the first feeding screw 44, and the second feeding screw 45. That is, with the rotations of the supplying roller 51, the first feeding screw 44, and the second feeding screw 45, the toner receives a frictional force and a contact force from the carrier, the supplying roller 51, and the screws. By receiving the frictional force and the contact force, the external additive deposited on the toner surface comes off the toner itself or is buried in the toner resin. Due to occurrence of toner deterioration, an increase in depositing force between toner particles, a change in bulk density, and a change such as a lowering in flowability of the developer occur.

In this embodiment, by the following constitution, the magnetic attraction force Fr is made strong in a region from the opposing portion P1 between the developing roller 50 and the supplying roller 51 to an upstream portion thereof, whereby it is possible to compatibly realize suppression of the carrier deposition and suppression of the developer deterioration in the opposing region between the regulating blade 52 and the supplying roller 51.

Specifically, in this embodiment, an absolute value |Br| of a maximum value (largest value) of the magnetic flux density in the normal direction at the surface of the supplying roller 51 is made larger at the regulating pole N2 than at the scooping pole S2 and is made larger at the regulating pole N2 than at the regulating pole N2. That is, a magnitude of the absolute value |Br| of the magnetic flux density was set to satisfy (holding pole S1)>(regulating pole N2)>(scooping pole S2). A result of measurement of the absolute value |Br of the maximum value of the magnetic flux density in the normal direction for each of magnetic poles in embodiment 3 in which the above-described relationship in this embodiment (third embodiment) is satisfied and comparison examples 2 and 3 in which the above-described relationship in this embodiment is not satisfied is shown in a table 4 below.

TABLE 4

(unit: mT)

| | N1 | S1 | N2 | S2 |
|---|---|---|---|---|
| EMB. 3 | 90 | 55 | 50 | 45 |
| COMP.EX. 2 | 90 | 55 | 60 | 45 |
| COMP.EX. 3 | 90 | 55 | 50 | 55 |

Incidentally, the absolute value |Br| of the magnetic flux density of the receiving pole S4 of the magnet roller 50*a* of the developing roller 50 was 40 mT in all the embodiment 3 and the comparison examples 2 and 3. The magnitude relationship between the absolute values |Br| of the magnetic flux density of the magnet roller 51*a* of the supplying roller 51 was set to satisfy (holding pole S1)>(rotational direction N1)>(scooping pole S2) in the embodiment 3, (regulating pole N2)>(holding pole S1) in the comparison example 2, and (scooping pole S2)>(regulating pole N2) in the comparison example 3.

Figure 7:
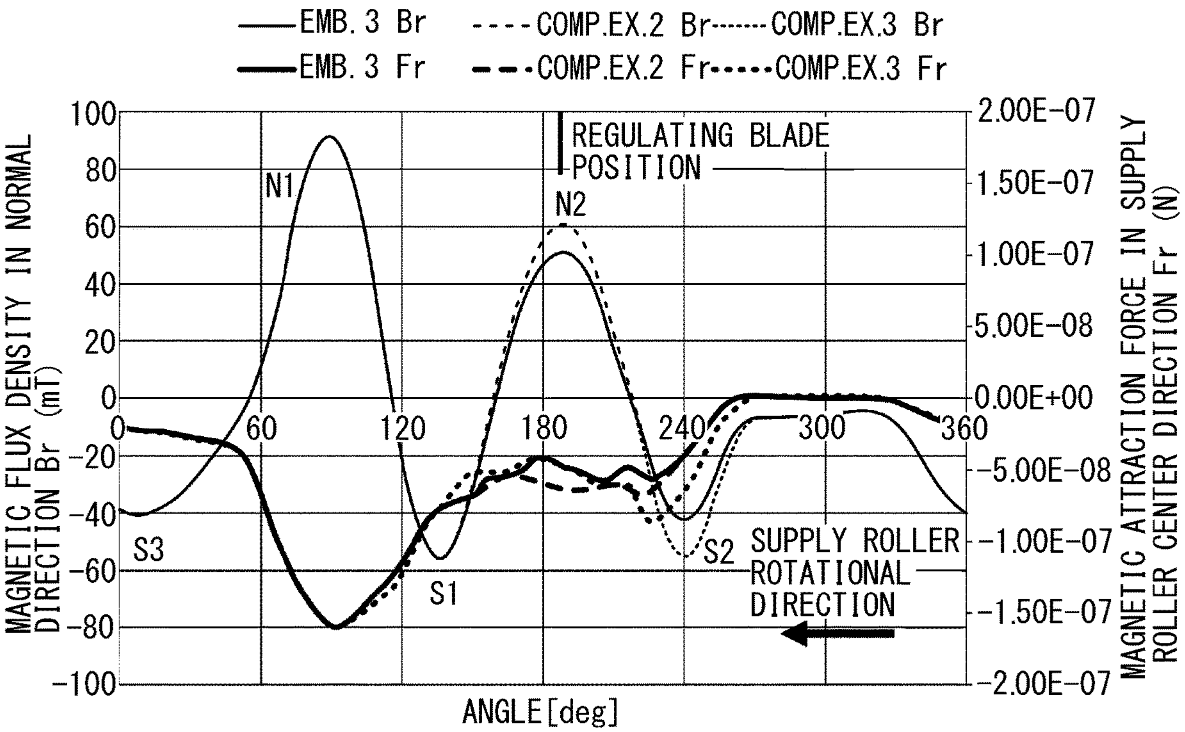
FIG. 7 is a graph showing a relationship between the angle of the supplying roller, the magnetic flux density Br in the normal direction, and the magnetic attraction force Fr in the supplying roller center direction, according to each of an embodiment 3, a comparison example 2, and a comparison example 3.

In FIG. 7, the magnetic flux density Br (slid line) in the embodiment 3, the magnetic flux density Br (broken line) in the comparison example 2, and the magnetic flux density Br (dotted line) in the comparison example 3 are shown. Further, the magnetic attraction force Fr (bold solid line) in the embodiment 3, the magnetic attraction force Fr (bold broken line) in the comparison example 2, and the magnetic attraction force Fr (bold broken line) in the comparison example 3 are also shown in FIG. 7. Further, in FIG. 7, as indicated by an arrow, a direction from a right side toward a left side of the abscissa is the rotational direction of the supplying roller 51, and in the following description, "upstream" and "downstream" which are simply mentioned refer to "upstream" and "downstream", respectively, with respect to the rotational direction of the supplying roller 51.

In all of the embodiment 3 and the comparison examples 2 and 3, the magnetic attraction force is kept large in the region from the main pole N1 to the holding pole S1, and therefore, the carrier deposition from the supplying roller 51 onto the developing roller 50 can be reduced. On the other hand, when attraction is paid to the regulating pole N2, by making the magnetic flux density of the regulating pole N2 smaller in the embodiment 3 than in the comparison example 2, the magnetic attraction force at the periphery of the regulating pole N2 becomes low, so that the developer deterioration can be suppressed. Further, as in the comparison example 3, when the scooping pole S2 is larger in magnetic flux density than the regulating pole N2, the magnetic attraction force in a portion upstream of the regulating pole N2 increases. In the portion upstream of the regulating pole N2, a conveyance amount of the developer is regulated by the regulating blade 52, and therefore, the developer stagnates and a large developer pressure is applied to the portion, so that the developer deterioration is liable to occur. For that reason, in order to suppress the developer deterioration, it is required that the magnetic attraction force on the side upstream of the regulating pole N2 is lowered as much as possible.

From the above, the magnitude of the absolute value |Br| of the magnetic flux density is made to satisfy (holding pole S1)>(regulating pole N2)>(scooping pole S2) as in this embodiment, it is possible to compatibly realize reduction of the carrier deposition onto the developing roller 50 and suppression of the developer deterioration.

Here, the magnitudes of the magnetic flux density Br of the respective magnetic poles may desirably provide a difference of 5 mT or more, preferably 10 mT or more. That is, the absolute value |Br| of the maximum value (largest value) of the magnetic flux density in the normal direction at the surface of the supplying roller 51 may desirably be larger for the holding pole S1 than for the regulating pole N2 by 5 mT or more, preferably 10 mT or more. Further, the absolute value |Br| of the maximum value of the magnetic flux density may desirably be larger for the regulating pole N2 than for the scooping pole S2 by 5 mT or more, preferably 10 mT or more. This is because inversion in magnitude relationship of the absolute value |Br| of the magnetic flux density between the magnetic poles due to a part tolerance of the magnet roller 51*a* is prevented.

Incidentally, not only the magnitude relationship between the scooping pole S2, the regulating pole N2, and the holding pole S1 but also the main pole N1 may preferably satisfy the magnitude relationship of (main pole N1)>(holding pole S1)>(regulating pole N2)>(scooping pole S2) as in the embodiment 3. That is, the absolute value |Br| of the maximum value of the magnetic flux density in the normal direction at the surface of the supplying roller 51 may preferably be larger for the main pole N1 than for the holding pole S1. This is because in the opposing portion P1 between the supplying roller 51 and the developing roller 50, the toner collection from the developing roller 50 is effectively carried out by forming stronger magnetic chains and thus the occurrence of the ghost phenomenon can be suppressed.

Fourth Embodiment

A fourth embodiment will be described using FIGS. 8 to 10 while making reference to FIG. 3. In this embodiment, a magnetic flux density distribution of the regulating pole N2 is changed from the third embodiment. Other constitutions and actions are similar to those in the third embodiment, and therefore, the similar constitutions are omitted from description and illustration or briefly described by adding the same reference numerals or symbols, and in the following, a difference from the first embodiment will be principally described.

Also, in the case of this embodiment, the magnitude of the absolute value |Br| of the maximum value (largest value) of the magnetic flux density satisfies the relationship of (holding pole S1)>(regulating pole N2)>(scooping pole S2) similarly as in the third embodiment. On the other hand, in this embodiment, different from the third embodiment, the distribution of the magnetic flux density Br of the regulating pole N2 in the normal direction at the surface of the supplying roller 51 has a shape such that in the case where a position where the magnetic flux density becomes maximum (largest) is a first regulating pole position and a position where the magnetic flux density is 50% of the maximum value (largest value) is a second regulating pole position and a third regulating pole position, the first regulating pole position is positioned on a side downstream of a middle position between the second regulating pole position and the third regulating pole position with respect to the regulating pole of the supplying roller 51.

In other words, in the case of this embodiment, the shape of the distribution of the magnetic flux density Br was made asymmetrical so that in the regulating pole N2, an absolute value |ΔBr| of a change amount of Br per angle of 1 degree is larger on a downstream side than on an upstream side with respect to the rotational direction of the supplying roller 51.

Specifically, |Br| at a point where the magnetic flux density Br becomes 0 on an upstream side and a downstream side of the holding pole S1 was 2.0 mT/deg on the upstream side and 3.0 mT/deg on the downstream side.

Figure 8:
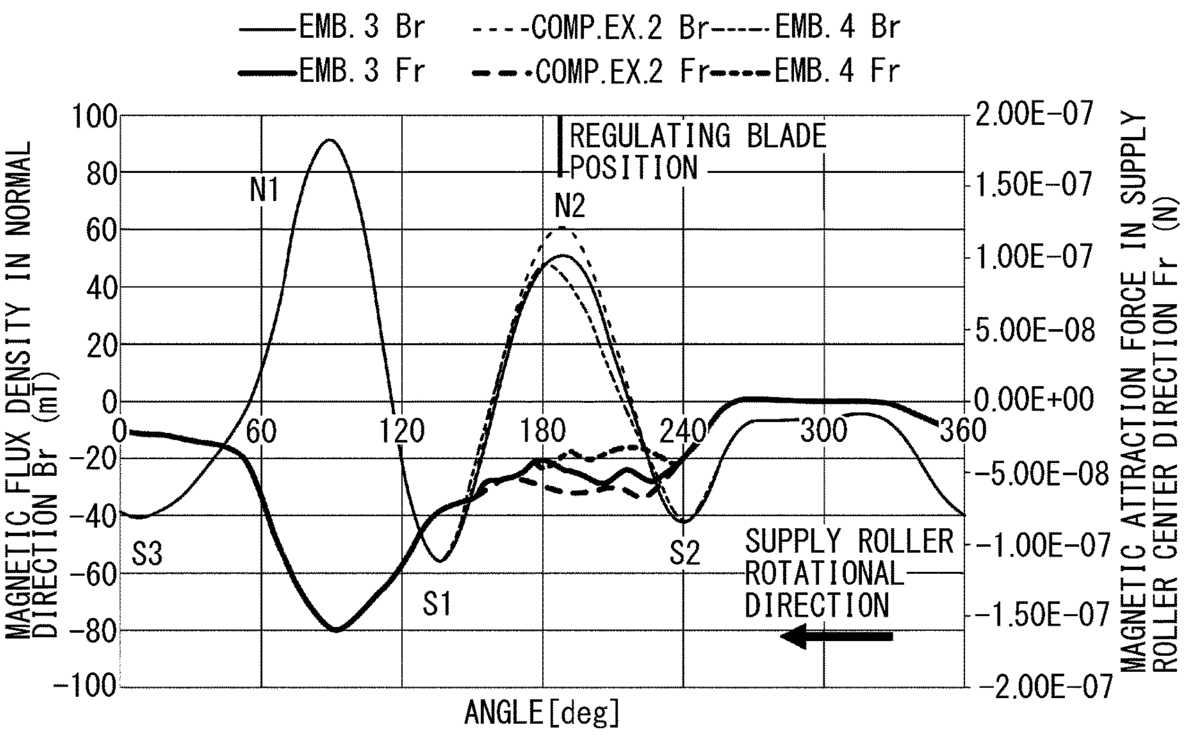
FIG. 8 is a graph showing a relationship between the angle of the supplying roller, the magnetic flux density Br in the normal direction, and the magnetic attraction force Fr in the supplying roller center direction, according to each of the embodiment 3, an embodiment 4, and the comparison example 2.

FIG. 8 shows the magnetic flux density Br (chain double-dashed line) in the embodiment 4 in which the condition in this embodiment is satisfied, the magnetic flux density Br (solid line) in the embodiment 3 described in the third embodiment, and the magnetic flux density Br (dotted line) in the comparison example 2. Further, the magnetic attraction forces Fr in the embodiments 4 and 3 and the comparison example 2 are also shown together by associated bold lines, respectively. Further, in FIG. 8, as indicated by an arrow, a direction from a right side toward a left side of the abscissa is the rotational direction of the supplying roller 51, and in the following description, "upstream" and "downstream" which are simply mentioned refer to "upstream" and "downstream", respectively, with respect to the rotational direction of the supplying roller 51. In the embodiment 4, compared with the embodiment 3, the absolute value |ΔBr| of the change amount of Br of the regulating pole N2 on the upstream side of the rotational direction of the supplying roller 51 is made small, whereby the absolute value of the magnetic attraction force Fr in a position upstream of the opposing position between the supplying roller 51 and the regulating blade 52 becomes lower in the embodiment 4 than in the embodiment 3. For that reason, in the embodiment 4, compared with the embodiment 3, the developer deterioration can be more effectively suppressed.

Here, the asymmetrical shape of the distribution of the magnetic flux density Br of the regulating pole N2 in this embodiment will be described using FIG. 9. FIG. 9 is an enlarged view of the magnetic flux density Br in the embodiment 4 shown in FIG. 8 at a periphery of the regulating pole N2.

Figure 9:
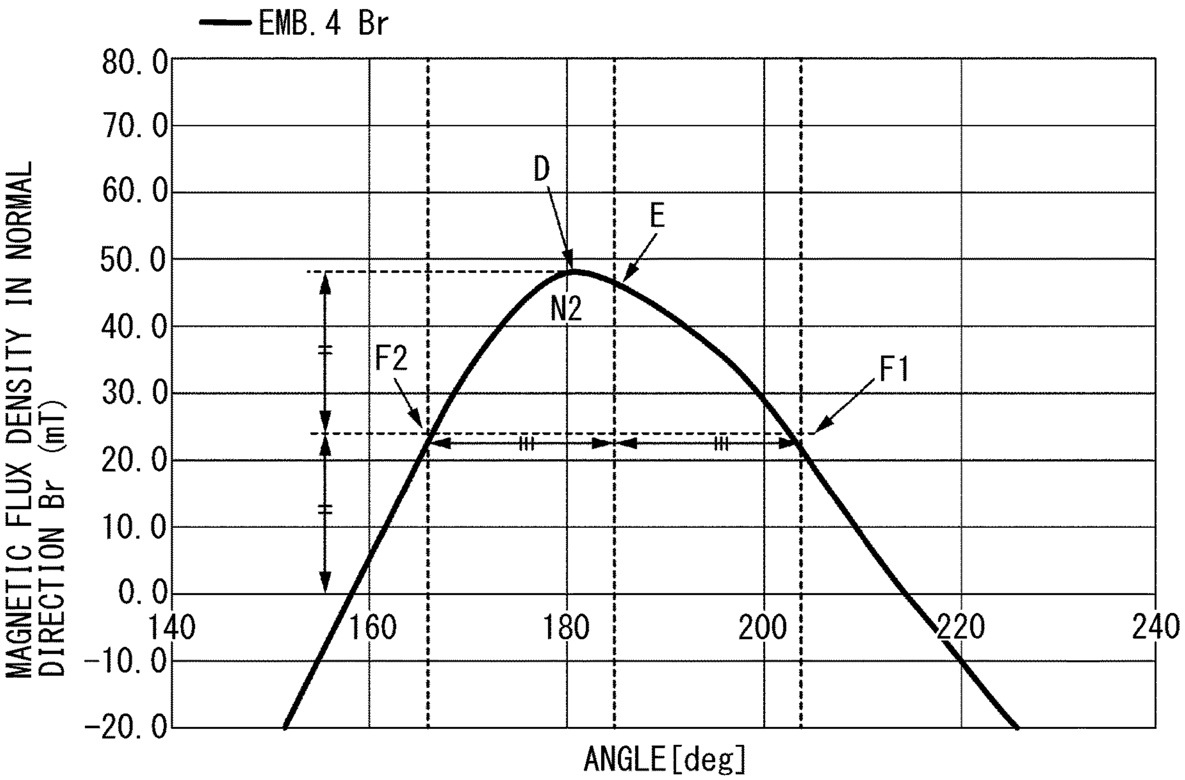
FIG. 9 is a graph showing a relationship between an angle at a periphery of a regulating pole N2 of the supplying roller and the magnetic flux density Br in the normal direction, according to the embodiment 4.

In FIG. 9, a point D represents a position (first regulating pole position) where the magnitude of the magnetic flux density Br of the regulating pole N2 becomes maximum. A point E represents a middle position between a position of a point F1 (second regulating pole position) where the magnetic flux density Br is 50% (half value) of the magnetic flux density Br at the point D and a position of a point F2 (third regulating pole position) where the magnetic flux density Br is 50% of the magnetic flux density Br at the point D. In this embodiment, the position of the point D is positioned on a side downstream of the position of the point E with respect to the rotational direction of the rotational direction of the supplying roller 51, so that the distribution of the magnetic flux density Br of the regulating pole N2 is asymmetrical.

A difference in angle between the point D and the point E may desirably be 3° or more, preferably 4° or more. That is, the first regulating pole position (point D) where the magnetic flux density of the regulating pole N2 becomes maximum may desirably be positioned on a side downstream of the middle position (point E) with respect to the rotational direction of the supplying roller 51 by 3° or more, preferably 4° or more.

Further, it is desirable that a pole position difference between the point D of the regulating pole N2 and a position where the magnetic flux density of the scooping pole S2 becomes maximum may desirably be larger than a pole position difference between the point D of the regulating pole N2 and a position where the magnetic flux density of the holding pole S1 becomes maximum by 6° or more, preferably 8° or more. That is, in the case where a position where the magnetic field density Br of the scooping pole S2 in the normal direction at the surface of the supplying roller 51 becomes maximum is taken as a fourth position and a position where the magnetic field density Br of the holding pole S1 in the normal direction at the surface of the supplying roller 51 becomes maximum is taken as a fifth position, with respect to the rotational direction of the supplying roller 51, an angle between the first regulating pole position (point D) and the fourth position is larger than an angle between the first regulating pole position (point D) and the fifth position by 6° or more, preferably 8° or more. This is because the magnetic flux density Br of the regulating pole N2 is made asymmetrical even in a part tolerance range of the magnet roller 51*a*.

FIG. 10 is a table showing a result of an experiment conducted for confirming an effect of the embodiments 3 and 5. Verification was conducted also for an embodiment 5 in which the magnitude of the absolute value |Br| of the magnetic flux density satisfies (holding pole "HOLD" S1)>(main pole "MAIN" N1)>("RGT" N2)>(scooping pole "SCOOP" S2). Thus, in the embodiment 5, the magnitude of the absolute value |Br| of the magnetic flux density satisfies (holding pole S1)>(main pole N1)>(scooping pole S2). However, the absolute value of the maximum value of the magnetic flux density Br in the normal direction at the surface of the supplying roller 51 is larger for the main pole N1 than for the regulating pole N2 and is larger for the holding pole S1 than for the main pole N1. That is, relative to the relationship of "(main pole N1)>(holding pole S1)>(regulating pole N2)>(scooping pole S2)" in the embodiment 3, the magnitude relationship in absolute value |Br| of the magnetic flux density between the main pole N1 and the holding pole S1 is changed to each other.

Confirmation of the effect was made by eye observation of the occurrence or non-occurrence of each of the carrier deposition and the ghost (hysteresis phenomenon) on the test image formed in each of the constitutions of the embodiments 3 to 5 and the comparison examples 2 and 3. In FIG. 10, each of the case where the ghost image (on which the ghost phenomenon occurred) appeared and the case where the carrier was deposited on the image (carrier deposition image ("C.D.I.")) was evaluated as "x". In each of the case where the ghost image did not appear and the case where the carrier was not deposited on the image was evaluated as "○".

A degree of the developer deterioration was evaluated in the following manner. In the developing device 4 with each of constitutions, 300 g of the developer was placed. Then, a toner aggregation degree of toner particles in the developer circulated for 3 hours in the developing device 4 by driving the supplying roller 51, the developing roller 50, the first feeding screw 44 and the second feeding screw 45 was measured. At this time, the photosensitive drum 1 is not disposed opposed to the developing device 4, so that the toner is not consumed. The toner aggregation degree was measured using a powder tester (manufactured by Hosokawa Micron Group). On the powder tester, three sieves of 60 mesh, 100 mesh, and 200 mesh were set in a named order from above. Then, 5 g of a weighed sample was gently placed on an uppermost sieve, and vibration was applied to the sieves under application of a voltage of 17 V for 15 seconds. Then, a weight of the toner remaining on each of the sieves was weighed, and the toner aggregation degree was calculated in accordance with a formula below.

Here, the toner image on an uppermost-stage sieve is taken as T, the toner amount on an intermediary-stage sieve is taken as C, and the toner amount on a lowermost-stage sieve is taken as B. At this time, when $X=T/5\times100$, $Y=C/5\times100\times0.6$, and $Z=B/5\times100\times0.2$ hold, the toner aggregation degree is represented by the following formula.

$$(\text{Aggregation degree})(\%)=X+Y+Z$$

As the developer deterioration advances, the toner aggregation degree becomes large. The toner aggregation degree of fresh (new) toner is 20%. Further, by using the deteriorated developer, a fog image ("FOG") (developer deterioration ("DD")) was checked. The case where the fog image occurred was evaluated as "x", and the case where the fog image did not occur was evaluated as "○".

A scooping performance ("SCCP PRFM") was checked in a manner such that an amount of the developer charged in the developing device 4 was changed and a minimum developer amount of the developer capable of being carried and conveyed by the supplying roller 51 in an entire region with respect to a rotational axis direction was measured. In the case where the supplying roller 51 cannot carry the developer over the entire region with respect to the rotational axis direction, there is a portion where the toner cannot be supplied to the developing roller 50, and therefore, an image void occurs when a whole surface image is formed in an entire region of the photosensitive drum 1 on which an electrostatic latent image is formed was shown as a result of the scooping performance.

From FIG. 10, it was confirmed that in the embodiments 3, 4 and 5, the magnitude of the absolute value |Br| of the magnetic flux density satisfies (holding pole S1)>(regulating pole N2)>(scooping pole S2), whereby the toner aggregation degree becomes lower than in the comparison examples 2 and 3 while suppressing the carrier operation and thus the degree of the developer deterioration is reduced.

In the embodiment 4, the distribution of the magnetic flux density Br of the regulating pole N2 is made asymmetrical, so that the degree of the developer deterioration was further reduced compared with the embodiment 3, while the scooping performance was somewhat lowered compared with the embodiment 3. In the embodiment 5, the relationship of (holding pole S1)>(main pole N1) is employed, with the result that the ghost image occurred.

Other Embodiments

The above-described surface and fourth embodiments are capable of being executed in combination with the first and second embodiments. For example, in the third embodiment or the fourth embodiment, the distribution of the magnetic flux density of the holding pole S1 may satisfy a requirement of the distribution of the magnetic flux density of the holding pole S1 in the second embodiment.

In the above-described embodiments, the case where the present invention is applied to the developing device for use in the image forming apparatus of the tandem type was described. However, the present invention is also applicable to the developing device for use in the image forming apparatus of another type. Further, the image forming apparatus is not limited to the image forming apparatus for a full-color image, but may also be an image forming apparatus for a monochromatic image or an image forming apparatus for a mono-color (single color) image. Or, the image forming apparatus can be carried out in various uses, such as printers, various printing machines, copying machines, facsimile machines and multi-function machines by adding necessary devices, equipment and casing structures or the like.

Further, also as regards the structure of the developing device, as described above, the structure is not limited to a structure in which the developing chamber and the stirring chamber are disposed in the horizontal direction, but may also be a structure in which the developing chamber and the stirring chamber are disposed in a direction inclined with respect to the horizontal direction. In summary, a constitution in which the developing chamber as the first chamber and the stirring chamber as the second chamber are disposed adjacent to each other so as to partially overlap with each other as viewed in the horizontal direction may only be employed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-011050 filed on Jan. 27, 2022, which is hereby incorporated by reference herein in its entirety.

What is claimed is:

1. A developing device comprising:

a developing container configured to accommodate a developer containing toner and a carrier;

a developing roller configured to carry and convey the toner to a developing position where an electrostatic latent image formed on an image bearing member is developed with the toner;

a supplying roller provided opposed to the developing roller and configured to supply only the toner to the developing roller while carrying and conveying the developer supplied from the developing container, said supplying roller being rotated in a rotational direction opposite to a rotational direction of the developing roller in a position where the supplying roller and the developing roller oppose each other;

a first magnet provided non rotationally and fixedly inside the developing roller and including a first magnetic pole;

a second magnet provided non rotationally and fixedly inside the supplying roller and including:

a second magnetic pole which is provided opposed to the first magnetic pole in a position where the supplying roller opposes the developing roller and which is different in polarity from the first magnetic pole, a third magnetic pole which is provided upstream of and adjacent to the second magnetic pole with respect to the rotational direction of the supplying roller and which is different in polarity from the second magnetic pole, a fourth magnetic pole which is provided upstream of and adjacent to the third magnetic pole with respect to the rotational direction of the supplying roller and which is different in polarity from the third magnetic pole, and a fifth magnetic pole which is provided downstream of and adjacent to the second magnetic pole with respect to the rotational direction of the supplying roller and which is different in polarity from the second magnetic pole; and a regulating member provided opposed to the fourth magnetic pole and configured to regulate an amount of the developer carried on the supplying roller, wherein with respect to a normal direction to an outer peripheral surface of the supplying roller, an absolute value of a maximum magnetic flux density of the second magnetic pole is larger than an absolute value of a maximum magnetic flux density of the third magnetic pole, and an absolute value of a maximum magnetic flux density of the third magnetic pole is larger than an absolute value of a maximum magnetic flux density of the fourth magnetic pole, and wherein with respect to the rotational direction of the supplying roller, an angle between a position where the magnetic flux density of the second magnetic pole becomes maximum with respect to the normal direction and a position where the magnetic flux density of the third magnetic pole becomes maximum with respect to the normal direction is smaller than an angle between a position where the magnetic flux density of the second magnetic pole becomes maximum with respect to the normal direction and a position where the magnetic flux density of the fifth magnetic pole becomes maximum with respect to the normal direction.

2. A developing device according to claim 1, wherein with respect to the rotational direction of the supplying roller, the angle between the position where the magnetic flux density of the second magnetic pole becomes maximum with respect to the normal direction and the position where the magnetic flux density of the third magnetic pole becomes maximum with respect to the normal direction is smaller than the angle between the position where the magnetic flux density of the second magnetic pole becomes maximum with respect to the normal direction and the position where the magnetic flux density of the fifth magnetic pole becomes maximum with respect to the normal direction by 10 degrees or more.

3. A developing device according to claim 1, wherein with respect to the rotational direction of the supplying roller, the angle between the position where the magnetic flux density of the second magnetic pole becomes maximum with respect to the normal direction and the position where the magnetic flux density of the third magnetic pole becomes maximum with respect to the normal direction is smaller than the angle between the position where the magnetic flux density of the second magnetic pole becomes maximum with respect to the normal direction and the position where the magnetic flux density of the fifth magnetic pole becomes maximum with respect to the normal direction by 15 degrees or more.

4. A developing device according to claim 1, wherein the absolute value of the maximum magnetic flux density of the third magnetic pole is larger than the absolute value of the maximum magnetic flux density of the fifth magnetic pole with respect to the normal direction.

5. A developing device according to claim 4, wherein the absolute value of the maximum magnetic flux density of the third magnetic pole is larger than the absolute value of the maximum magnetic flux density of the fifth magnetic pole with respect to the normal direction by 5 mT or more.

6. A developing device according to claim 4, wherein the absolute value of the maximum magnetic flux density of the third magnetic pole is larger than the absolute value of the maximum magnetic flux density of the fifth magnetic pole with respect to the normal direction by 10 mT or more.

7. A developing device according to claim 4, wherein with respect to the rotational direction of the supplying roller, the angle between the position where the magnetic flux density of the second magnetic pole becomes maximum with respect to the normal direction and the position where the magnetic flux density of the third magnetic pole becomes maximum with respect to the normal direction is smaller than an angle between a position where the magnetic flux density of the third magnetic pole becomes maximum with respect to the normal direction and a position where the magnetic flux density of the fourth magnetic pole becomes maximum with respect to the normal direction.

8. A developing device according to claim 7, wherein with respect to the rotational direction of the supplying roller, the angle between the position where the magnetic flux density of the second magnetic pole becomes maximum with respect to the normal direction and the position where the magnetic flux density of the third magnetic pole becomes maximum with respect to the normal direction is smaller than the angle between the position where the magnetic flux density of the third magnetic pole becomes maximum with respect to the normal direction and the position where the magnetic flux density of the fourth magnetic pole becomes maximum with respect to the normal direction by 10 degrees or more.

9. A developing device according to claim 1, wherein the absolute value of the maximum magnetic flux density of the second magnetic pole is larger than the absolute value of the maximum magnetic flux density of the third magnetic pole with respect to the normal direction by 5 mT or more.

10. A developing device according to claim 1, wherein the absolute value of the maximum magnetic flux density of the second magnetic pole is larger than the absolute value of the maximum magnetic flux density of the third magnetic pole with respect to the normal direction by 10 mT or more.

11. A developing device according to claim 1, wherein the absolute value of the maximum magnetic flux density of the third magnetic pole is larger than the absolute value of the maximum magnetic flux density of the fourth magnetic pole with respect to the normal direction by 5 mT or more.

12. A developing device according to claim 1, wherein the absolute value of the maximum magnetic flux density of the third magnetic pole is larger than the absolute value of the maximum magnetic flux density of the fourth magnetic pole with respect to the normal direction by 10 mT or more.

13. A developing device according to claim 1, wherein in a case that positions where the magnetic flux density of the third magnetic pole is 50% of the maximum magnetic flux density of the third magnetic flux density with respect to the normal direction are a first position and a second position, with respect to the rotational direction of the supplying roller, the position where the magnetic flux density of the third magnetic pole becomes maximum with respect to the normal direction is downstream of an intermediary position between the first position and the second position by 3 degrees or less.

14. A developing device according to claim 1, wherein in a case that positions where the magnetic flux density of the third magnetic pole is 50% of the maximum magnetic flux density of the third magnetic flux density with respect to the normal direction are a first position and a second position, with respect to the rotational direction of the supplying roller, the position where the magnetic flux density of the third magnetic pole becomes maximum with respect to the normal direction is downstream of an intermediary position between the first position and the second position by 4 degrees or more.

15. A developing device according to claim 1, wherein the second magnet further includes a six magnetic pole which is provided upstream of and adjacent to the fourth magnetic pole with respect to the rotational direction of the supplying roller and which is different in polarity from the fourth magnetic pole, and wherein the absolute value of the maximum magnetic flux density of the fourth magnetic pole is larger than the absolute value of the maximum magnetic flux density of the six magnetic pole with respect to the normal direction.

16. A developing device according to claim 15, wherein the absolute value of the maximum magnetic flux density of the fourth magnetic pole is larger than the absolute value of the maximum magnetic flux density of the six magnetic pole with respect to the normal direction by 5 mT or more.

17. A developing device according to claim 15, wherein the absolute value of the maximum magnetic flux density of the fourth magnetic pole is larger than the absolute value of the maximum magnetic flux density of the six magnetic pole with respect to the normal direction by 10 mT or more.

18. A developing device according to claim 1, wherein the second magnet further includes a sixth magnetic pole which is provided upstream of and adjacent to the fourth magnetic pole with respect to the rotational direction of the supplying roller and which is different in polarity from the fourth magnetic pole, and wherein with respect to the rotational direction of the supplying roller, an angle between a position where the magnetic flux density of the fourth magnetic pole becomes maximum with respect to the normal direction and a position where the magnetic flux density of the sixth magnetic pole becomes maximum with respect to the normal direction is smaller than an angle between a position where the magnetic flux density of the third magnetic pole becomes maximum with respect to the normal direction and a position where the magnetic flux density of the fourth magnetic pole becomes maximum with respect to the normal direction.

19. A developing device according to claim 18, wherein the angle between the position where the magnetic flux density of the fourth magnetic pole becomes maximum with respect to the normal direction and the position where the magnetic flux density of the sixth magnetic pole becomes maximum with respect to the normal direction is larger than the angle between the position where the magnetic flux density of the third magnetic pole becomes maximum with respect to the normal direction and the position where the magnetic flux density of the fourth magnetic pole becomes maximum with respect to the normal direction by 6 degrees or more.

20. A developing device according to claim 18, wherein the angle between the position where the magnetic flux density of the fourth magnetic pole becomes maximum with respect to the normal direction and the position where the magnetic flux density of the sixth magnetic pole becomes maximum with respect to the normal direction is larger than the angle between the position where the magnetic flux density of the third magnetic pole becomes maximum with respect to the normal direction and the position where the magnetic flux density of the fourth magnetic pole becomes maximum with respect to the normal direction by 8 degrees or more.

* * * * *